US010474950B2

(12) United States Patent
He et al.

(10) Patent No.: US 10,474,950 B2
(45) Date of Patent: Nov. 12, 2019

(54) TRAINING AND OPERATION OF COMPUTATIONAL MODELS

(71) Applicant: Microsoft Technology Licensing, LLC, Redmond, WA (US)

(72) Inventors: Xiaodong He, Sammamish, WA (US); Jianshu Chen, Redmond, WA (US); Brendan W L Clement, Redmond, WA (US); Li Deng, Redmond, WA (US); Jianfeng Gao, Woodinville, WA (US); Bochen Jin, Bellevue, WA (US); Prabhdeep Singh, Newcastle, WA (US); Sandeep P. Solanki, Redmond, WA (US); LuMing Wang, Bellevue, WA (US); Hanjun Xian, Redmond, WA (US); Yilei Zhang, Kirkland, WA (US); Mingyang Zhao, Issaquah, WA (US); Zijian Zheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1142 days.

(21) Appl. No.: 14/754,474

(22) Filed: Jun. 29, 2015

(65) Prior Publication Data

US 2016/0379112 A1 Dec. 29, 2016

(51) Int. Cl.
G06N 3/08 (2006.01)
G06N 20/00 (2019.01)
G06N 3/04 (2006.01)

(52) U.S. Cl.
CPC ............... *G06N 3/08* (2013.01); *G06N 3/049* (2013.01); *G06N 3/0454* (2013.01); *G06N 20/00* (2019.01)

(58) Field of Classification Search
None
See application file for complete search history.

(56) References Cited

U.S. PATENT DOCUMENTS 8,768,867 B1    7/2014  Thaeler et al.
9,842,585 B2 *  12/2017 Huang ................. G10L 15/063
(Continued)

FOREIGN PATENT DOCUMENTS

CN       1555025     12/2004
WO    2006/084151     8/2006

OTHER PUBLICATIONS

Zheng et al., "Time Series Classification Using Multi-Channels Deep Convolutional Neural Networks", 2014, Springer International Publishing, 13pp (Year: 2014).*

(Continued)

*Primary Examiner* — Paulinho E Smith
(74) *Attorney, Agent, or Firm* — Schwegman Lundberg & Woessner, P.A.

(57) ABSTRACT

A processing unit can acquire datasets from respective data sources, each having a respective unique data domain. The processing unit can determine values of a plurality of features based on the plurality of datasets. The processing unit can modify input-specific parameters or history parameters of a computational model based on the values of the features. In some examples, the processing unit can determine an estimated value of a target feature based at least in part on the modified computational model and values of one or more reference features. In some examples, the computational model can include neural networks for several input sets. An output layer of at least one of the neural networks can be connected to the respective hidden layer(s) of one or more other(s) of the neural networks. In some examples, the neural networks can be operated to provide transformed feature value(s) for respective times.

18 Claims, 9 Drawing Sheets

(56) References Cited

U.S. PATENT DOCUMENTS

| | | | |
|---|---|---|---|
| 2004/0190732 A1* | 9/2004 | Acero | G10L 21/0208 381/94.1 |
| 2013/0204663 A1 | 8/2013 | Kahlow | |
| 2013/0212052 A1 | 8/2013 | Yu et al. | |
| 2014/0108094 A1 | 4/2014 | Beddo et al. | |
| 2014/0257805 A1* | 9/2014 | Huang | G10L 15/063 704/232 |
| 2015/0293976 A1* | 10/2015 | Guo | G06F 17/30554 707/706 |
| 2016/0379112 A1* | 12/2016 | He | G06N 3/08 706/25 |
| 2017/0024640 A1* | 1/2017 | Deng | G06N 3/08 |
| 2017/0032035 A1* | 2/2017 | Gao | G06N 3/08 |
| 2017/0193360 A1* | 7/2017 | Gao | G06N 3/08 |
| 2017/0286860 A1* | 10/2017 | Chen | G06N 99/005 |

OTHER PUBLICATIONS

Chang, et al., "A neural network with a case based dynamic window for stock trading prediction", In Proceedings of Expert Systems with Applications, vol. 36, Issue 3, Part 2, Apr. 2009, 2 pages.
"Forecasting Data and Methods", Retrieved on: May 20, 2015 Available at: https://www.otexts.org/fpp/1/4.
Kumar, et al., "Demand forecasting Using Artificial Neural Network Based on Different Learning Methods: Comparative Analysis", In the International Journal for Research in Applied Science and Engineering Technology, vol. 2, Issue 4, Apr. 2014, 11 pages.
Muller-Navarra, et al., "Sales Forecasting with Partial Recurrent Neural Networks: Empirical Insights and Benchmarking Results", In the Proceedings of the 48th Hawaii International Conference on System Sciences, Jan. 5, 2015, 9 pages.
Orra, et al., "An Exploratory Study for Neural Network Forecasting of Retail Sales Trends Using Industry and National Economic Indicators", In the Proceedings of the Workshop on Computational Intelligence in Economics and Finance, Jul. 2005, 4 pages.
Quek, et al., "A Novel Recurrent Neural Network Based Prediction System for Trading", In the Proceedings of the International Joint Conference on Neural Networks, Jul. 16, 2006, 1 page.
Thiesing, et al., "Forecasting Sales Using Neural Networks", In the Proceedings of the 5th Fuzzy Days International Conference, Apr. 28, 1997, 8 pages.
Zhang, et al., "Forecasting with artificial neural networks: The state of the art", In International Journal of Forecasting, vol. 14, Issue 1, Mar. 1998, 28 pages.
Zimmermann, et al., "Forecasting with Recurrent Neural Networks: 12 Tricks", In Neural Networks: Tricks of the Trade, Retrieved on: May 20, 2015, 21 pages.
Zoucas, et al., "Neural Network Model for Forecasting Production Time Series in Brazilian Industries", In the Proceedings of the 21st Annual POMS Conference, May 7, 2010, 30 pages.
Dalto, M., et al., "Deep Neural Networks for Ultra-Short-Term Wind Forecasting", IEEE, 2015, 7 pages.
Deng, L., et al., "Deep Stacking Networks for Informational Retrieval", IEEE, 2013, 5 pages.
PCT Search Report and Written Opinion for corresponding International Application No. PCT/US2016/039463, dated Sep. 23, 2016, 14 pages.
Liu, X., et al., "Representation Learning Using Multi-Task Deep Neural Networks for Semantic Classificaiton and Information Retrieval", 10 pages.
Zheng, Y., et al., "Time Series Classification Using Multi-Channels Deep Convolutional Neural Networks" Springer International Publishing, Switzerland, 2014, 13 pages.
"International Preliminary Report on Patentability Issued in PCT Application No. PCT/US2016/039463", dated Sep. 18, 2017, 9 Pages.
"Second Written Opinion Issued in PCT Application No. PCT/US2016/039463", dated May 29, 2017, 8 Pages.

* cited by examiner

TRAINING AND OPERATION OF COMPUTATIONAL MODELS

BACKGROUND

Artificial neural networks (hereinafter "neural networks") are useful for a range of problems. For example, some modeling techniques use deep neural network (DNN) models, e.g., neural networks with multiple hidden layers, for modeling the semantic meaning of text strings. DNN models can outperform semantic modeling techniques that use conventional topic models or latent semantic analysis (LSA) models. However, conventional DNNs are limited in the range of problems for which they can be used.

SUMMARY

This disclosure describes systems, methods, and computer-readable media for training computational models such as deep neural networks (DNNs) and for using the trained computational models in, e.g., extrapolating data series. In some examples, a computing device extracts feature values from a plurality of datasets organized according to respective, different data domains, each feature value corresponding to a time. The computing device operates a plurality of neural networks to provide an estimated value of a target feature based at least in part on the feature values, wherein each of the neural networks corresponds to a respective relative time period and includes a respective hidden layer communicatively connected with the hidden layer of another of the neural networks having a later relative time period. The computing device determines an error value of the estimated value of the target feature based at least in part on a corresponding training value, and trains the plurality of neural networks based at least in part on the error value and the feature values having times in the corresponding relative time period. The training includes adjusting parameters of the respective hidden layers of at least two of the neural networks. According to example techniques described herein, the computing device can operate respective neural networks for each of a plurality of times, e.g., time periods, to provide transformed feature value(s) based at least in part on ones of the feature value(s) associated with the corresponding ones of the plurality of times.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
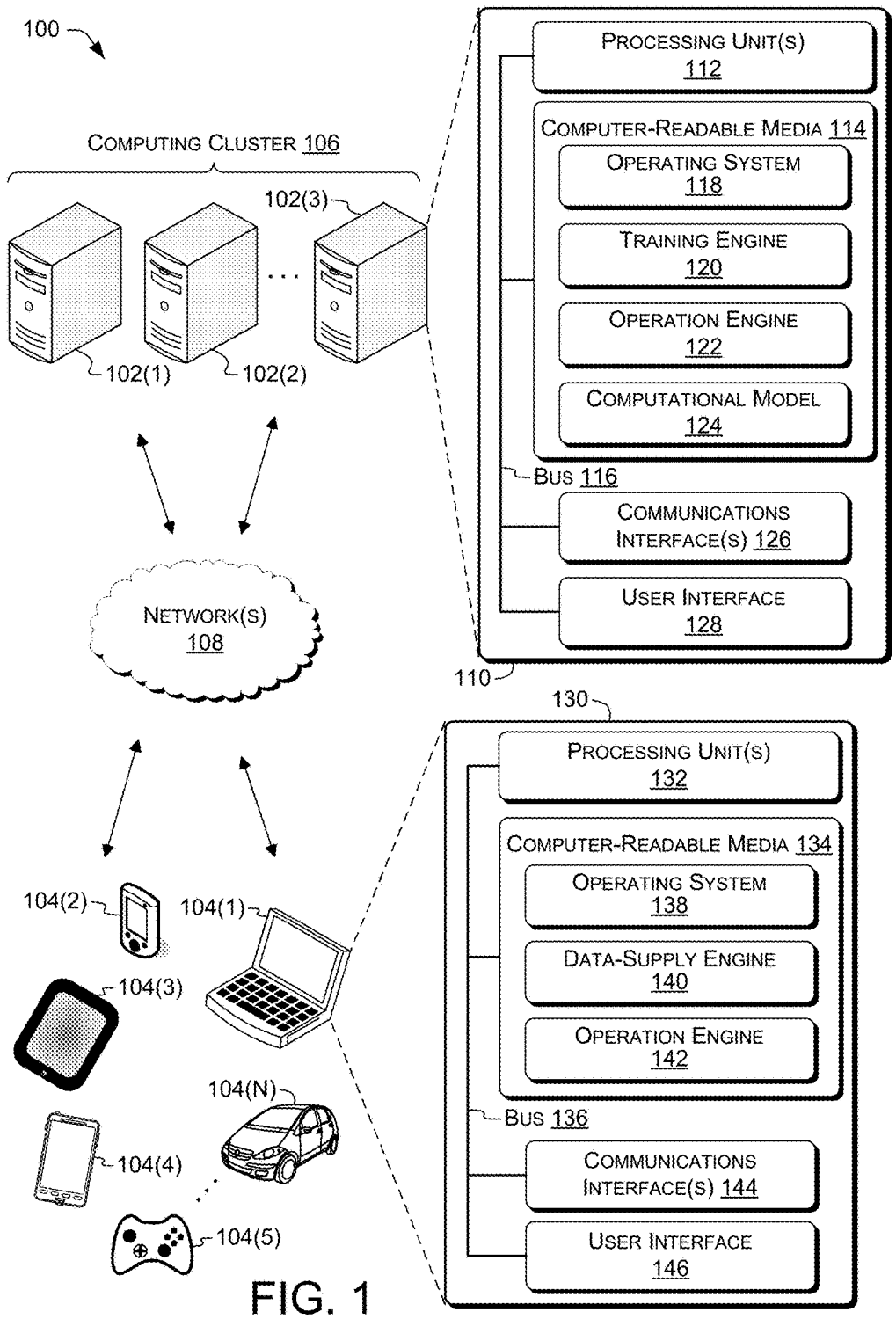
FIG. 1 is a block diagram depicting an example environment for implementing training and operation of computational models as described herein.

Examples described herein provide techniques and constructs to improve the training and operation of neural networks, e.g., deep neural networks (DNNs) having multiple hidden layers, by associating specific parameters of a DNN with specific sets of inputs to the DNN. This permits training and operating DNNs with more efficient usage of processing units. Some examples use a plurality of neural networks interconnected to provide extrapolation or forecasting based on historical data with reduced complexity and memory requirements. Some examples use ongoing training over time to improve accuracy of such extrapolation or forecasting in the presence of changes in trends in the input data over time.

Some examples use processing units provisioned as part of a cluster computing systems ("computing cluster" or "cluster") having several discrete computing nodes that work together to accomplish a computing task assigned to the cluster as a whole. Some such systems can have all, or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, or other programmatically-controlled operations. The term "resource" used with reference to clusters, nodes, and jobs refers generally to any commodity or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space or mounting/unmounting services, electrical power, etc.

In various examples, e.g., of DNNs trained for extrapolation of data series, e.g., forecasting, or other use cases noted herein, the DNNs may be context-dependent DNNs or context-independent DNNs. A DNN can have at least two hidden layers. A neural network trained using techniques described herein can have one hidden layer, two hidden layers, or more than two hidden layers. In some examples, e.g., useful with forecasting systems, a neural network or DNN as described herein has at least three hidden layers. Herein-described techniques relating to DNNs also apply to neural networks with less than two hidden layers unless otherwise expressly stated. The techniques described herein may include the use of an algorithm to parallelize the training of the DNNs across multiple processing units, e.g., cores of a multi-core processor or multiple general-purpose graphics processing units (GPGPUs). Accordingly, multiple layers of DNNs may be processed in parallel on the multiple processing units. Neural networks such as DNNs are commonly trained with minibatch-based stochastic gradient descent (SGD). SGD can be parallelized along three dimensions, model parameters, layers, and data (and combinations thereof).

In some examples, algorithms for DNN training as described herein can be performed on a computing device, such as a smart phone, a tablet, a desktop computer, a server, a server blade, a supercomputer, etc. The resulting DNNs can be used on such computing devices. The resulting DNNs can be used on computing devices having one or more input devices, such as a physical keyboard, a soft keyboard, a touch screen, a touch pad, microphone(s), or camera(s) to provide device optimized functions such as speech recognition, image recognition and search, and speech synthesis.

Various environments, configurations of electronic devices, and methods for training DNNs and using DNNs, e.g., for forecasting applications, are described further with reference to FIGS. 1-9. While many examples described herein relate to servers and other non-consumer electronic devices, other types of electronic devices can be used, e.g., as discussed with reference to FIG. 1.

Illustrative Environment

FIG. 1 shows an example environment 100 in which examples of computational model training systems, e.g., deep neural network (DNN) training systems, can operate or in which DNN training or use methods such as those described herein can be performed. In the illustrated example, the various devices and/or components of environment 100 include computing device(s) 102(1)-102(N) (individually or collectively referred to herein with reference 102), where N is any integer greater than or equal to 1, e.g., distributed computing resource(s), and computing devices 104(1)-104(K) (individually or collectively referred to herein with reference 104), where K is any integer greater than or equal to 1. In some examples, N=K; in other examples, N>K or N<K. Although illustrated as, e.g., desktop computers, laptop computers, tablet computers, or cellular phones, computing device(s) 102 or 104 can include a diverse variety of device categories, classes, or types and are not limited to a particular type of device. In the illustrated example, computing device(s) 102(1)-102(N) can be computing nodes in a computing cluster 106, e.g., a cloud service such as MICROSOFT AZURE. In the illustrated example, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, or provide fail-over support or redundancy. Computing devices 104 can additionally or alternatively operate in a cluster or grouped configuration.

By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices and other satellite-based navigation system devices, personal data assistants (PDAs), and other specialized portable electronic devices (e.g., 104(2)), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles (e.g., 104(N), represented graphically as an automobile), desktop computers, or integrated components for inclusion in computing devices, appliances, or other computing device(s) configured to participate in or carry out DNN training or operation as described herein, e.g., for forecasting purposes. In some examples, as indicated, computing device(s), e.g., computing devices 102(1) and 102(2), can intercommunicate to participate in or carry out DNN training or operation as described herein. For example, computing device 102(1) can be a data source and computing device 102(2) can be a DNN training system, as described below with reference to, e.g., FIGS. 2-5.

Different devices or types of computing devices 102 and 104 can have different needs or ways of interacting with cluster 106. For example, computing devices 104 can interact with cluster 106 with discrete request/response communications, e.g., for data forecasting using an already-trained model. Additionally or alternatively, computing devices 104 can be data sources and can interact with cluster 106 with discrete or ongoing transmissions of data to be used as input to a computational model. For example, a data source in an automobile, e.g., a computing device 104(N), can provide to cluster 106 data of location and environmental conditions around the car. This can provide improved accuracy of weather forecasting by increasing the amount of data input to the forecast model. Additionally or alternatively, computing devices 104 can be data sinks and can interact with cluster 106 with discrete or ongoing requests for data output from a computational model.

In some examples, computing devices 102 or 104 can communicate with each other or with other computing devices via one or more network(s) 108. In some examples, computing devices 102 and 104 can communicate with external devices via network(s) 108. For example, network(s) 108 can include public networks such as the Internet, private networks such as an institutional or personal intranet, or combination(s) of private and public networks. Private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Network(s) 108 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Different networks have different characteristics, e.g., bandwidth, latency, accessibility (open, announced but secured, or not announced), or coverage area. The type of network 108 used for any given connection between, e.g., a computing device 104 and cluster 106 can be selected based on these characteristics and on the type of interaction. For example, an example data source can be the "firehose" provided by the TWITTER microblogging system. The TWITTER firehose is a real-time feed of all messages sent by users via TWITTER. A feed from the TWITTER firehose can be carried via high-bandwidth, low-latency networks. By contrast, low-bandwidth networks can be used to carry data such as measurements from environmental sensors such as temperature sensors. Such sensors can provide infrequent updates, e.g., one value per minute of a gradually changing temperature.

Details of an example computing device 102(3) are illustrated at inset 110. The details of example computing device 102(3) can be representative of others of computing device(s) 102. However, each of the computing device(s) 102 can include additional or alternative hardware and/or software components. Still referring to the example of FIG. 1, computing device 102(2) can include one or more processing unit(s) 112 operably connected to one or more computer-readable media 114, e.g., memories, such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 112 can exchange data through an internal interface bus (e.g., PCIe), rather than or in addition to network 108. While the processing units 112 are described as residing on the computing device 102(3), in this example, the processing units 112 can also reside on different computing device(s) 102 or 104 in some examples. In some examples, at least two of the processing units 112 can reside on different computing device(s) 102 or 104. In such examples, multiple processing units 112 on the same computing device 102 or 104 can use a bus 116 of the computing device 102 or 104 to exchange data, while processing units 112 on different computing device(s) 102 or 104 can exchange data via network(s) 108.

Computer-readable media described herein, e.g., computer-readable media 114, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally or alternatively store instructions executable by external processing units such as by an external central processing unit (CPU) or external processor of any type discussed herein. In some examples at least one processing unit 112, e.g., a CPU, graphics processing unit (GPU), or hardware logic device, can be incorporated in computing device 102, while in some examples at least one processing unit 112, e.g., one or more of a CPU, GPU, or hardware logic device, can be external to computing device 102.

Computer-readable media 114 can store, for example, computer-executable instructions of an operating system 118, module(s) of a training engine 120, module(s) of an operation engine 122, and/or other modules, programs, or applications that are loadable and executable by processing unit(s) 112. In some examples not shown, one or more of the processing unit(s) 112 in one of the computing device(s) 102 or 104 can be operably connected to computer-readable media 114 in a different one of the computing device(s) 102 or 104, e.g., via communications interface and network 108.

For example, program code to perform steps of flow diagrams herein, e.g., to interact with training engine 120, can be downloaded from a server, e.g., computing device 102(1), to a client, e.g., computing device 104(K), e.g., via the network 108, and executed by one or more processing unit(s) in computing device 104(K). For example, the computer-executable instructions stored on the computer-readable media 114 can upon execution configure a computer such as a computing device 102 or 104 to perform operations described herein with reference to the operating system 118, the training engine 120, or the operation engine 122.

Computer-readable media 114 can also store, for example, a computational model 124. The computational model 124 can include, e.g., a DNN, a recurrent neural network (RNN), or a deep RNN (DRNN). The computational model 124 can include, e.g., activation weights, functions, or thresholds (collectively "neuron parameters") for artificial neurons of one or more neural networks. The training engine 120 can determine values of computational model 124 and the operation engine 122 can use the determined values of computational model 124 to perform, e.g., extrapolation, forecasting or other data analysis.

Processing unit(s) 112 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units 112 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 112 can represent a hybrid device, such as a device from ALTERA or XILINX that includes a CPU core embedded in an FPGA fabric. These or other hardware logic components can operate independently or, in some instances, can be driven by a CPU. In some examples, at least some of computing device(s) 102 or 104 can include a plurality of processing units 112 of multiple types. For example, the processing units 112 in computing device 102(3) can be a combination of one or more GPGPUs and one or more FPGAs. Different processing units 112 can have different execution models, e.g., as is the case for graphics processing units (GPUs) and central processing unit (CPUs).

Computing device 102 can also include one or more communications interfaces 126 connected via the bus 116 to processing units 112 to enable wired or wireless communications between computing device(s) 102 and other networked computing devices 102 or 104 involved in cluster computing, or other computing device(s), over network(s) 108. Such communications interface(s) 126 can include one or more transceiver devices, e.g., network interface controllers (NICs) such as Ethernet NICs or other types of transceiver devices, to send and receive communications over a network. The processing units 112 can exchange data through respective communications interface(s) 126. In some examples, the communications interface 126 can be a PCI Express (PCIe) transceiver, and the network 108 can be a PCIe bus. In some examples, the communications interface 126 can include, but is not limited to, a transceiver for cellular (3G, 4G, or other), WI-FI, Ultra-wideband (UWB), BLUETOOTH, or satellite transmissions. The communications interface 126 can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102(3).

Computer-readable media 114 of the computing device 102 can store an operating system 118. In some examples, operating system 118 is not used (commonly referred to as a "bare metal" configuration). In some examples, operating system 118 can include components that enable or direct the computing device 102 to receive data via various inputs (e.g., user controls, network or communications interfaces, memory devices, or sensors), and process the data using the processing unit(s) 112 to generate output. The operating system 118 can further include one or more components that present the output (e.g., display an image on an electronic display, store data in memory, and/or transmit data to another computing device). The operating system 118 can enable a user, e.g., a data analyst, to interact with the computing device 102(3) using a user interface. Additionally, the operating system 118 can include components that perform various functions generally associated with an operating system, e.g., storage management and internal-device management.

In some examples, computing device 102 can include a user interface 128 configured to permit a user, e.g., a data analyst or neural-network administrator, to operate the training engine 120 or the operation engine 122. Some examples of user interface 128 are discussed below.

Details of an example computing device 104(1) are illustrated at inset 130. The details of example computing device 104(1) can be representative of others of computing device(s) 104. However, each of the computing device(s) 104 can include additional or alternative hardware and/or software components. Computing device 104(1) can include one or more processing unit(s) 132 operably connected to one or more computer-readable media 134, e.g., via a bus 136. Some examples of processing unit(s) 132 are discussed above with reference to processing unit(s) 112. Some examples of computer-readable media 134 are discussed above with reference to computer-readable media 114. For example, computer-readable media 134 can include one or more computer storage media. Some examples of bus 136 are discussed above with reference to bus 116.

Computer-readable media 134 can store, for example, computer-executable instructions of an operating system 138, a data-supply engine 140 or module(s) thereof, an operation engine 142 or module(s) thereof, and/or other modules, programs, or applications that are loadable and executable by processing unit(s) 134. Some examples of operating system 138 are discussed above with reference to operating system 118.

In some examples, the data-supply engine 140 can be configured to provide one or more dataset(s) to computing device(s) 102, e.g., via network 108. The dataset(s) can be organized according to respective data domain(s), e.g., as discussed below. For example, a data-supply engine 140 in an automotive computing device 104(N) can be configured to operate sensors (not shown) to periodically sample temperature, wind speed and direction, barometric pressure, and GPS location, and to provide the sampled values to computing device(s) 102.

In some examples, the operation engine 142 can be configured to communicate with computing device(s) 102 to operate a neural network or other computational model 124. Some examples are discussed herein with reference to operation engine 122. For example, the operation engine 142 can transmit a request to computing device(s) 102 for an output of the computational model 124, receive a response, and present the response to a user. In some examples, the functions of operation engine 122 and operation engine 142 can be shared between one or more computing device(s) 102 and one or more computing device(s) 102. For example, the computing device(s) 104 can operate an input layer of one or more neural network(s) and the computing device(s) 102 can operate a hidden layer of one or more neural network(s).

Computing device 104 can also include one or more communications interfaces 144 connected via the bus 136 to processing unit(s) 132 to enable wired or wireless communications between computing device(s) 104 and other networked computing devices 102 or 104 involved in cluster computing, or other computing device(s), over network(s) 108. Some examples are discussed above with reference to communications interface(s) 126.

In some examples, computing device 104 can include a user interface 146. For example, computing device 104(4) can provide user interface 146 to control or otherwise interact with cluster 106 or computing devices 102 therein. For example, processing unit(s) 132 can receive inputs of user actions via user interface 146 and transmit corresponding data via communications interface(s) 144 to computing device(s) 102.

User interfaces 128 or 146 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like. User interface 128 or 146 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like.

Illustrative Components

Figure 2:
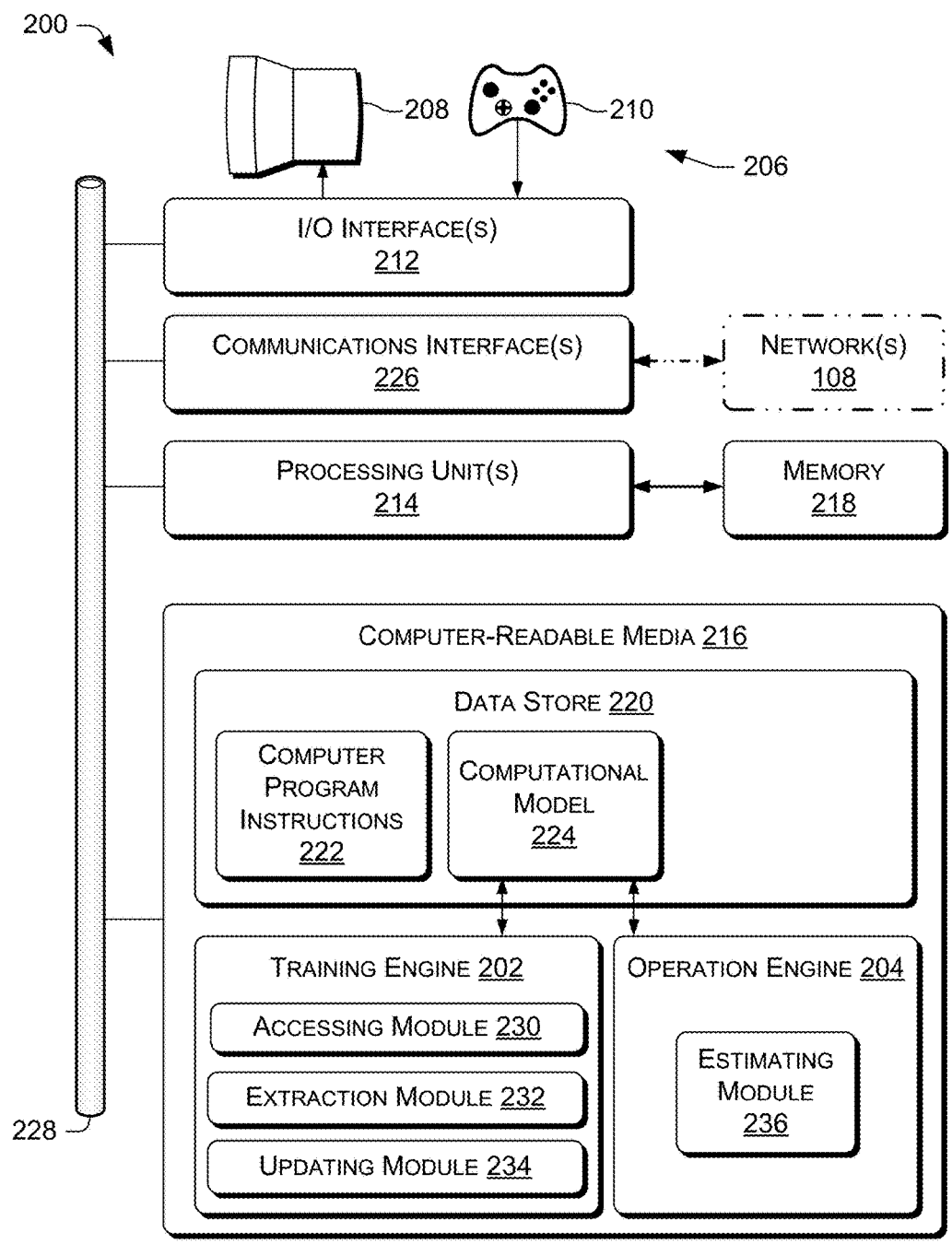
FIG. 2 is a block diagram depicting an example computing device configured to participate in training and operation of computational models according to various examples described herein.

FIG. 2 is an illustrative diagram that shows example components of an computing device 200, which can represent computing device(s) 102 or 104, and which can be or implement a DNN training or operation system, device, or apparatus, according to various examples described herein. Computing device 200 can implement a training engine 202, which can represent training engine 120, FIG. 1. Computing device 200 can implement an operation engine 204, which can represent operation engine 122 or 142, FIG. 1. Computing device 200 can include or be included in a system or device for training or operating a neural network or other computational model as described herein.

Computing device 200 can include or be connected to a user interface 206, which can represent user interface 128 or 146. User interface 206 can include a display 208. Display 208 can include an organic light-emitting-diode (OLED) display, a liquid-crystal display (LCD), a cathode-ray tube (CRT), or another type of visual display. Display 208 can be a component of a touchscreen, or can include a touchscreen. User interface 206 can include various types of output devices described above with reference to user interface 128 or 146. In some examples, computing device 200 can be communicatively connected with a user interface 146, FIG. 1, of another computing device.

User interface 206 can include a user-operable input device 210 (graphically represented as a gamepad). User-operable input device 210 can include various types of input devices described above with reference to user interface 128 or 146.

Computing device 200 can further include one or more input/output (I/O) interface(s) 212 to allow computing device 200 to communicate with input, output, or I/O devices (for clarity, some not depicted). Examples of such devices can include components of user interface 206 such as user-operable input devices and output devices described above with reference to user interface 128 or 146. Other examples of such devices can include power meters, accelerometers, and other devices for measuring properties of computing device 200 or its environment or of another computing device 102 or 104. Computing device 200 can communicate via I/O interface 212 with suitable devices or using suitable electronic/software interaction methods. Input data, e.g., of user inputs on user-operable input device 210, can be received via I/O interface(s) 212, and output data, e.g., of user interface screens, can be provided via I/O interface(s) 212 to display 208, e.g., for viewing by a user.

The computing device 200 can include one or more processing unit(s) 214, which can represent processing unit(s) 112 or 132. Processing units 214 can be operably coupled to the I/O interface 212 and to at least one computer-readable media 216, discussed below. Processing unit(s) 214 can include, e.g., processing unit types described above such as CPU- or GPGPU-type processing unit(s). In some examples, processing unit(s) 214 can include or be connected to a memory 218, e.g., a RAM or cache.

In some examples, computer-readable media 216 of the computing device 200 can represent computer-readable media 114 or 134, FIG. 1, and can store a plurality of modules of the training engine 202 or the operation engine 204. Processing unit(s) 214 can be configured to execute modules of the plurality of modules. For example, the computer-executable instructions stored on the computer-readable media 216 can upon execution configure a computer such as a computing device 200 to perform operations described herein with reference to the modules of the plurality of modules. The modules stored in the computer-readable media 216 can include instructions that, when executed by the one or more processing units 214, cause the one or more processing units 214 to perform operations described below. Examples of modules in computer-readable media 216 are discussed below. Computer-readable media 216 can also include an operating system, e.g., operating system 118. Computer-readable media 216 can be computer storage media, as discussed above.

In the illustrated example, computer-readable media 216 includes a data store 220. In some examples, data store 220 can include data storage, structured or unstructured, such as a database (e.g., a Structured Query Language, SQL, or NoSQL database) or data warehouse. In some examples, data store 220 can include a corpus or a relational database with one or more tables, arrays, indices, stored procedures, and so forth to enable data access. Data store 220 can store data for the operations of processes, applications, components, or modules stored in computer-readable media 216 or computer instructions in those modules executed by processing unit(s) 214. In some examples, the data store can store computer program instructions 222 (e.g., instructions corresponding to processes described herein or to other software executable by processing unit(s) 214), computational model 224, which can represent computational model 124, FIG. 1, data, e.g., datasets, to be used for training or operation of the computational model 224, metadata, e.g., of data domains (discussed below), database schema(s), or any combination thereof. In some examples, computational model 224 can include respective input-specific parameters for each of a plurality of input sets of the computational model and one or more history parameters, as discussed below.

The computing device 200 can also include a communications interface 226, which can represent communications interface 126 or 144. For example, communications interface 226 can include a transceiver device such as a network interface controller (NIC) to send and receive communications over a network 108 (shown in phantom), e.g., as discussed above. As such, the computing device 200 can have network capabilities. For example, the computing device 200 can exchange data with computing devices 102 or 104 (e.g., laptops, computers, and/or servers) via one or more network(s) 108, such as the Internet. In some examples, e computing device 200 can receive data from one or more data source(s) (not shown) via one or more network(s) 108. Example data source(s) can include computing devices 102 or 104, sensors, data aggregators, or data feeds, e.g., via application programming interfaces (APIs). The processing units 214 can retrieve data from the data source(s), e.g., via an HTTP request such as a GET to a Web Services or Representational State Transfer (REST) API endpoint.

In some examples, the processing unit(s) 214 can access the module(s) on the computer-readable media 216 via a bus 228, which can represent bus 116 or 136, FIG. 1. I/O interface 212 and communications interface 226 can also communicate with processing unit(s) 214 via bus 228.

The modules of the training engine 202 stored on computer-readable media 216 can include one or more modules, e.g., shell modules, or API modules) which are illustrated as an accessing module 230, an extraction module 232, and an updating module 234.

The modules of the operation engine 204 stored on computer-readable media 216 can include one or more modules, e.g., shell modules, or application programming interface (API) modules) which are illustrated as an estimating module 236.

In the training engine 202 or the operation engine 204, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the accessing module 230 and the extraction module 232 can be combined in a single module that performs at least some of the example functions described below of those modules. In some examples, computer-readable media 216 can include a subset of modules 230, 232, 234, and 236.

In some examples, computer-readable media 216 have thereon computer-executable instructions, the computer-executable instructions upon execution configuring a computer to perform operations described herein.

In some examples, the extraction module 232 can be configured to extract feature values from a plurality of datasets organized according to respective, different data domains, each feature value corresponding to a time. Some examples are discussed below with reference to FIG. 3.

In some examples, the updating module 234 can determine an error value of the estimated value of the target feature (or "supervision feature") based at least in part on a corresponding training value. The updating module 234 can then train the plurality of neural networks based at least in part on the error value and the feature values having times in the corresponding relative time period, wherein the training includes adjusting parameters of the respective hidden layers of at least two of the neural networks. Some examples are discussed below with reference to FIG. 4.

In some examples, the estimating module 236 can be configured to operate a plurality of neural networks to provide an estimated value of a target feature based at least in part on the feature values. In some examples, each of the neural networks corresponds to a respective relative time period and includes a respective hidden layer communicatively connected with the hidden layer of another of the neural networks having a later relative time period. Some examples are discussed below with reference to FIG. 4.

In some examples, the extraction module 232 can extract second feature values from a second plurality of datasets organized according to the respective, different data domains, each second feature value corresponding to a time later than any time of the extracted feature values. This situation can occur, e.g., when a sliding window of feature values has slid fully past a previously-analyzed set of feature values. In some examples, the estimating module 236 can be configured to operate the trained plurality of neural networks to provide a second estimated value of the target feature based at least in part on the second feature values, including operating each neural network of the trained plurality of neural networks with extracted second feature values having times in the corresponding relative time periods. In some examples, the estimating module 236 operates each of the plurality of neural networks by transforming the corresponding ones of the extracted feature values according to respective, different input-specific parameters of the neural networks.

Figure 3:
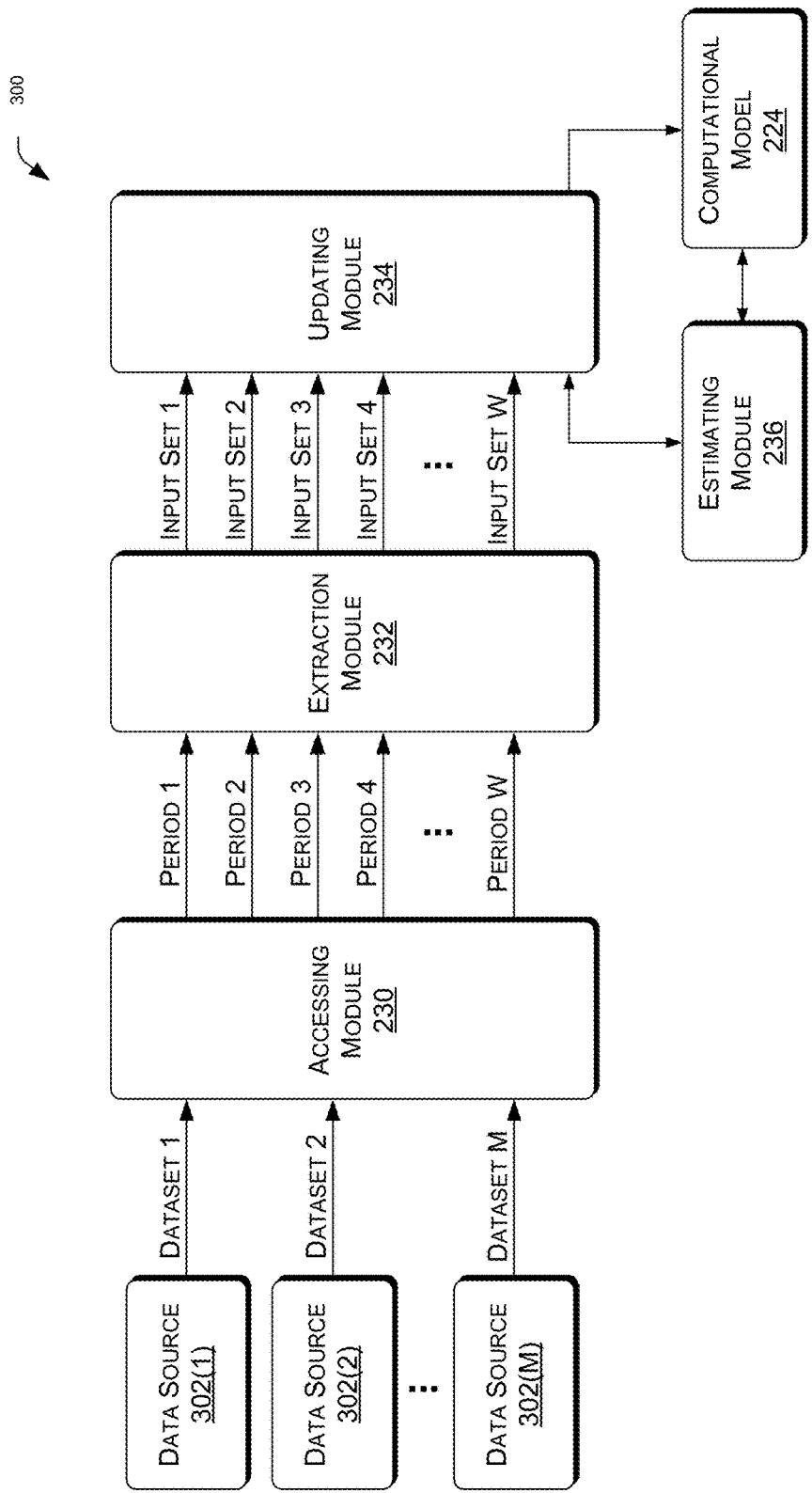
FIG. 3 is a dataflow diagram depicting example module interactions during training and operation of a computational model.

FIG. 3 is a dataflow diagram 300 illustrating example interactions between the modules illustrated in FIG. 2.

In some examples, the accessing module 230 can be configured to acquire a plurality of datasets from respective ones of a plurality of data sources 302(1)-302(M) (individually or collectively referred to herein with reference 302). The data in each dataset can be organized according to a respective unique data domain of the respective data source 302. Examples of data domains are discussed below. A data domain corresponds to the type of data provided by a data source 302. Each dataset can include one or more records of data. As used herein, the term "record" does not require any fixed format, length, or commonality of structure within or between data domains. For example, each message sent via the TWITTER microblogging service or another similar service can be represented as a single record in a dataset of microblogging messages, even though messages can vary in length and content (e.g., by containing images, text, or links).

In some examples, each dataset includes values associated with specific times. The accessing module 230 can be configured to group values from different datasets by time. For example, the accessing module 230 can receive M time series of weekly data values and provide W groups of values, e.g., one group per week, each group including values from each of the datasets. This is graphically represented by the "Period 1"–"Period W" labels. However, in other examples, the accessing module 230 can provide the datasets unchanged or unsorted.

In some examples, the extraction module 232 can be configured to determine values of a plurality of features based at least in part on the plurality of datasets from the data sources 302. For example, the feature can include a sensor reading or count of occurrences of a specific event.

In some examples, the extraction module 232 can be configured to apply nonlinear transformation(s) to input data value(s) from the accessing module 230 to provide value(s) of the features. For example, the extraction module 232 can apply functions such as sigmoid curves to constrain value(s) to fall within selected ranges. In other examples, the extraction module 232 can apply functions that, e.g., adjust input data value(s), e.g., corresponding to sales volumes or other counts, according to the week days and holidays in a period, e.g., by applying different weights to elected input data value(s) of different days. In some examples, the extraction module 232 can apply non-linear transformations on the data, e.g., as in Eq. (1):

$$f(x) = 2a\left(\frac{1}{1+e^{-\frac{x}{a}}} - \frac{1}{2}\right) \quad (1)$$

which smoothly limits the range of x into the range (−a, a) using an adjusted sigmod function.

In some examples, the extraction module 232 can determine value(s) of feature(s) not used by the updating module 234. Similarly, throughout this discussion, any block or module can produce additional values beyond those provided to a subsequent block or module.

In the example shown, the extraction module 232 provides a plurality of input sets to the computational model 224. Continuing the example above, there is shown one input set per week, weeks 1-W, however, input sets can correspond to other times, e.g., regularly or irregularly spaced. For example, a selected first one of the input sets of the computational model 224 and a selected second one of the input sets of the computational model 224 can be separated along a temporal sequence by one day, one week, one month, or one year. In some examples, the extraction module 232 arranges data by time period instead of or in addition to the accessing module 230.

In some examples, the input sets of the computational model 224 correspond to respective ones of a plurality of time periods, e.g., weeks. The time periods can be regular (e.g., each input set corresponds to the same length of time) or irregular (e.g., at least two input sets correspond to respective, different lengths of time). A time period can be an absolute time period, e.g., the day Mar. 14, 2015 or the week Mar. 8, 2015-Mar. 14, 2015. A time period can alternatively be a relative time period, e.g., the first, second, ... $n^{th}$ week in a given analysis period. For example, a calendar-year analysis period can be divided into twelve time periods, one per month, regardless of which calendar year is being analyzed.

An example data domain is, e.g., number of search queries for specific keywords per time period. Data corresponding to that domain can be provided, e.g., by a search engine such as BING using an API. For example, the accessing module 230 can provide the specific keywords to a search engine in an API request. The search engine can return results as a function of time, e.g., binned per day. The accessing module 230 or the extraction module 232 can re-bin the results into weeks or other time periods and provide the re-binned data as input sets 1-W.

Search results per time period are only one example of a data domain. In some examples, the data domains can include domains of one or more items per time period, for the items listed in Tables 1 and 2. Throughout Tables 1 and 2, the term "relevant" refers to discussion below of ways of selecting records, e.g., based on keywords or semantic features, and other techniques for selecting which records to use in estimating value(s) of target feature(s).

TABLE 1

| Domain | Nonlimiting Examples |
|---|---|
| Completion counts | Events corresponding to, e.g., post-sale activations of products, sales of a product to a customer, or sales or shipment of manufactured products to a distributor or retailer. |
| Event counts | Other events, e.g., promotions, presentation of advertisement impressions, clicks on online advertisements, or other non-date-related events, e.g., leading to event-triggered outliers as discussed below. Completion counts for prior, similar, or related products can be event counts. |
| Historical counts | Completion or event counts for a given time period in a previous year, quarter, or other time period. For example, completion counts in the period 2014 Nov. 28 00:00-23:59 (Black Friday 2014 in the United States) can serve as historical counts for the period 2015 Nov. 27 00:00-23:59 (Black Friday 2015). |
| Search data | Number of relevant search queries made to one or more search engine(s), e.g., in absolute terms or as a proportion of the total queries made to such engine(s); number of selections of (e.g., clicks on links to) relevant search results (organic or sponsored); numbers of such selections when advertisements are present on the search results page or absent from the search results page; numbers or proportions of relevant search results presented; |

TABLE 2

| Domain | Nonlimiting Examples |
|---|---|
| Newly-created documents | Number of relevant documents created in a selected time range, e.g., the time period, from selected content repositories. This can be determined, e.g., from indexes, e.g., of Web pages, that are maintained and updated by search engine crawlers. Example content repositories can include, e.g., individual Web sites, all pages indexed by a particular crawler, pages on deal or other sales Web sites, or libraries or bookstores offering paper or electronic books. |
| Social-media posts | Number of relevant social-media posts or other actions, e.g., TWITTER tweets or FACEBOOK posts or likes, or number of such posts having or expressing a particular sentiment with respect to a topic of interest (e.g., positive, neutral, or negative sentiment with respect to a product, company, or service). |
| Dates | Dates of the time period or corresponding time periods in other months, quarters, or years, for example. |
| Date events | Holidays, election days, long weekends, or other date-related events, e.g., leading to event-triggered outliers as discussed below. |
| Web-page visits | Number or identity of relevant Web pages accessed, e.g., in absolute numbers or as a proportion of a larger set of Web page accesses (e.g., for a given Web site). |

In some examples, the extraction module 232 can be further configured to determine the values of at least one of the plurality of features based at least in part on records in at least one of the plurality of datasets including predetermined search keys. Such records can be considered to be relevant. Some examples are that given above of search results matching a given set of keywords. Another example is the TWITTER firehose. The extraction module 232 can select from the firehose messages matching search keys, e.g., keywords or other text strings, regular expressions or other matching patterns, or Boolean searches or other complex search expressions, over the message as a whole or in specific fields or combinations of fields in the message.

In some examples, the extraction module 232 can be further configured to determine semantic features of records in at least one of the plurality of datasets. This can be done, e.g., using a deep structured semantic model (DSSM). The DSSM can include a DNN that maps a term vector of word counts in a message or other discrete units in a dataset into a smaller vector indicating characteristics of the message. In some examples, the DSSM can provide, for messages containing the words "Surface Pro," "Surface Pro 3," "SPro," or "SPro3," together with other words indicating that tablet computers are under discussion, a single bit or other field indicating that the MICROSOFT SURFACE PRO 3 tablet computer is a subject of the message. The extraction module 232 can then determine the values of at least one of the plurality of features based at least in part on ones of the records having the semantic features corresponding to predetermined target semantic features. Such records can be considered to be relevant. Continuing the firehose example above, the extraction module 232 can use the DSSM or other semantic model to determine semantic features of each message in the firehose, and then select from the firehose messages indicating that they are relevant to the MICROSOFT SURFACE PRO 3 tablet computer or another subject or subjects of interest.

In some examples, the updating module 234 can be configured to modify at least some of the input-specific parameters or the history parameters of the computational model based at least in part on the values of at least some of the plurality of features. For example, the updating module 234 can perform a neural-network training process or other supervised-learning process.

In some examples, the plurality of features determined by the extraction module 232 includes a target feature and one or more reference features (also known as "input features" or "raw features"). For example, the target feature can represent measured or other "ground truth" data. The reference features can represent inputs from which the computational model 224 is to determine an approximation or estimation to the target feature. In some examples, the reference features can include search-result data, user-sentiment data, or data from other domains listed above, and the target feature can include sales or a related value, e.g., post-sale product activations. In another example, the reference features can include air temperature and pressure, or populations, and the target feature can include location of a front.

In some of these examples, the updating module 234 can be configured to modify the at least some of the input-specific parameters or the history parameters of the computational model 224 based at least in part on values of the target feature and values of the one or more reference features. For example, the updating module 234 can carry out a neural-network training process.

In some examples, the estimating module 236 can be configured to determine an estimated value of the target feature, e.g., a forecast or predicted value, based at least in part on the computational model 224 and values of the one or more reference features. For example, the estimating module 236 can provide at least some of the values of the one or more reference features in each of the input sets of the computational model 224. The estimating module 236 can then run a forward propagation pass through a neural-network computational model 224 to determine the estimated value of the target feature. In some examples, the estimated value of the target feature can correspond to a time subsequent to a time period of the values of the one or more reference features. This permits using the computational model 224 for forecasting.

The updating module 234 can determine one or more error signals (or "error indications," and likewise throughout) of the computational model 224 based at least in part on the estimated value of the target feature and a provided value of the target feature, e.g., by subtracting the estimated value of the target feature from the provided value of the target feature. Additionally or alternatively, the estimating module 236 can provide error signal(s) to the updating module 234. The updating module 234 can modify the computational model 124 to reduce the error in the computation of the estimated value of the target feature.

In some examples, the estimating module 236 can be configured to perform forecasting, e.g., using a trained neural network. The estimating module 236 can be configured to determine an estimated value of the target feature, e.g., a forecast or predicted value, based at least in part on the modified computational model and values of the one or more reference features, wherein the estimating module provides at least some of the values of the one or more reference features in each of the input sets of the computational model.

Figure 4:
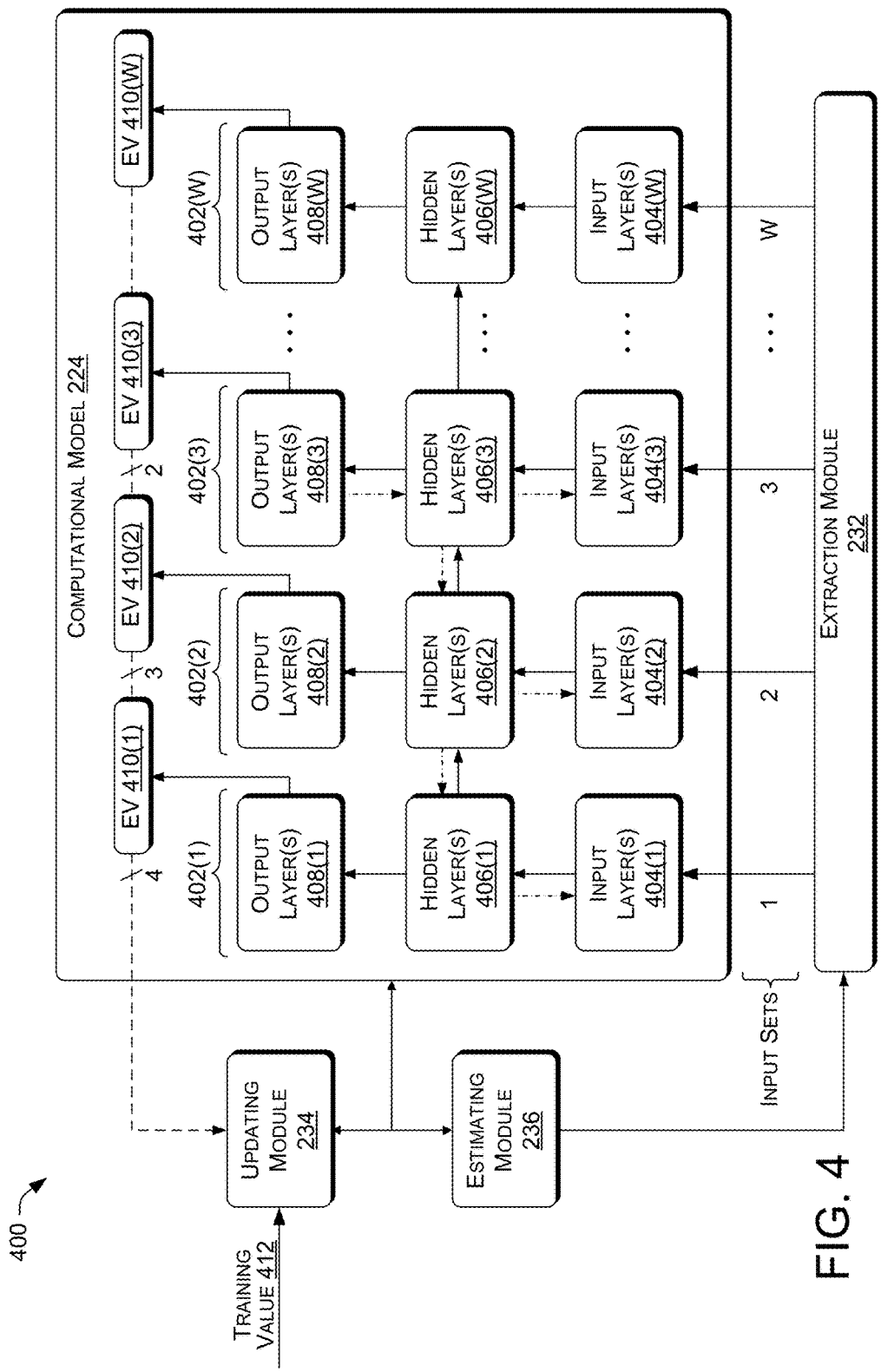
FIG. 4 is a block diagram depicting training and operation of a computational model using neural networks according to various examples described herein.

FIG. 4 is a dataflow diagram 400 illustrating an example implementation of training or operation of computational model 224 using neural networks. In the illustrated example, the computational model 224 includes respective neural networks 402(1)-402(W) (individually or collectively referred to herein with reference 402) for each of the input sets 1–W provided by the extraction module 232. In some examples, W=4 or W=6. In some examples, W is an integer greater than zero.

Individual ones of the neural networks 402(1)-402(W) have respective sets 404(1)-404(W) of one or more input layers (individually or collectively referred to herein as "input layers" with reference 404). As shown, individual ones of the neural networks 402 also have respective sets 406(1)-406(W) of one or more hidden layers (individually or collectively referred to herein as "hidden layers" with reference 406), and respective sets 408(1)-408(W) of one or more output layers (individually or collectively referred to herein as "output layers" with reference 408). In some examples, one or more of the neural networks 402, or one or more of the layers or sets of layers 404, 406, or 408, can be combined into combination neural networks, layers, or sets of layers. As used herein, the term "neural network" encompasses connected, independently-operable subnetworks of a larger neural network. In some of the examples, the neural networks 402 have respective, different neuron parameters of the respective input layers 404 and respective, different neuron parameters of the respective hidden layers 406.

In the illustrated example, the input-specific parameters of the computational model 224 correspond to neuron parameters of the input layer(s) 404 of the corresponding neural network 402. For example, operating each of the plurality of neural networks 402 can include transforming the corresponding ones of the extracted feature values according to respective, different input-specific parameters of the neural networks 402. In some examples, the input layer(s) 404 are configured to apply nonlinear transformation(s) to input data value(s) from the extraction module 232. In some examples, the computational model 224 includes one or more transformation components (not shown) configured to apply nonlinear transformation(s) to input data value(s) from the extraction module 232 and to provide nonlinearly-transformed value(s) to the input layer(s) 404.

In the illustrated example, the history parameters of the computational model 224 correspond to neuron parameters of the hidden layer(s) 406 of the corresponding neural network 402. The output layer 408 of at least one of the neural networks 402 is connected to the respective hidden layer(s) 406 of one or more other(s) of the neural networks 402. This arrangement permits maintaining history in the computational model 224, so that output values of the computational model 224 can represent, e.g., complex relationships between inputs and outputs over multiple time periods. Also in the example shown, at least one of the respective output layer(s) 408 of each of the neural networks 402 is connected to at least one of the respective hidden layer(s) 406. In the illustrated example, the hidden layers 406 are shown in a daisy-chain connection. However, other configurations are possible. For example, hidden layer 406(3) can be connected not only to hidden layer 406(2) but also to hidden layer 406(1).

In some examples, the input sets of the computational model correspond to a temporal sequence, e.g., of days, weeks, quarters, or years, as discussed above. At least a first one of the neural networks 402 is connected to at least one of the respective hidden layer(s) 406 of one(s) of the neural networks 402 corresponding to input set(s) earlier in the temporal sequence than the input set of the first one of the neural networks 402. For example, at least one of the respective hidden layer(s) 406 of the first one of the neural networks 402 or at least one of the respective output layer(s) 408 of the first one of the neural networks 402 can be connected with hidden layer(s) 406 earlier in the temporal sequence. In the example shown, with the temporal sequence increasing from 1 to W, hidden layer(s) 406(W) are connected with hidden layer(s) 406(3), hidden layer(s) 406(3) are connected with hidden layer(s) 406(2), and hidden layer(s) 406(2) are connected with hidden layer(s) 406(1). This arrangement permits maintaining history in the computational model 224 without requiring special-purpose structures such as dedicated history registers.

In the illustrated example, individual one(s) of the neural network(s) 402 produce respective output(s) 410(1)-410(W) (individually or collectively referred to herein with reference 410). In some examples, the output(s) 410 are or include estimated values (shown as "EV") of the target feature, as discussed above with reference to the estimating module 236. For example, the outputs 410, denoted $y_t$, $t \in [1, W]$, can be determined as in Eqs. (2) and (3):

$$y_t = f(u \cdot h_t) \quad (2)$$

$$h_t = \sigma(W \cdot h_{t-1} + V \cdot x_t) \quad (3)$$

where σ represents activation function(s) of neurons in hidden layers 406, $x_t$ represents, e.g., the input set for time period t or value(s) produced by input layer 404(t), $h_t$ represents output(s) of hidden layer 406(t), V represents weighting factor(s) on the value(s) produced by input layers 404, U represents weighting factor(s) on the value(s) produced by hidden layers 406 and provided to output layers 408, and W represents weighting factor(s) on the value(s) produced by hidden layers 406 and provided to other hidden layers 406, e.g., later in a temporal sequence.

In some examples, the estimating module 236 can be configured to operate the extraction module 232 to provide the feature values to the neural networks 402, so that the output(s) 410 include at least one estimated value of a target feature. This permits using the neural networks 402 in the computational model 224 for forecasting. In some examples, the estimated value of the target feature can be output 410(W). In some examples, the output(s) 410 correspond to forecast values at a predetermined relative or absolute future time period. In some examples, outputs 410(1)-410(W) can correspond to years 2015, 2016, 2017, . . . 2015+W−1 respectively. In another example, outputs 410(1)-410(W) can correspond to time periods 1+L, 2+L, . . . , W+L respectively, for a lead time L specified in the same units as the time periods 1−W (e.g., days, weeks, or years).

In some examples, one or more of the output(s) 410 can be provided to the updating module 234, as graphically represented by the dashed lines and arrows. The updating module 234 can also receive training value(s) 412 corresponding to one or more of the output(s) 410. The updating module 234 can determine error value(s) of the estimated value(s) of the target feature (e.g., output(s) 410) based at least in part on the corresponding training value(s) 412.

In some examples, using the error value(s), the updating module 234 can train one(s) of the neural networks 402 based at least in part on the error value(s) and the feature value(s) having times in the relative time period of those neural network(s) 402. The updating module 234 can, e.g., adjust parameters, e.g., neuron parameters, of hidden layer(s) 406 of one or more, e.g., at least two, of the neural networks 402. The updating module 234 can train the one(s) of the neural networks 402 using a backpropagation training algorithm, e.g., SGD, with backpropagation provided from a neural network 402 back to hidden layer(s) 406 or input layer(s) 404 in neural network(s) 402 earlier in the temporal sequence. Some examples of training based on an error signal corresponding to output 410(3) are shown by the dash-dot arrows, which represent the adjustment of parameters during backpropagation, e.g., for training deep neural networks or recurrent neural networks.

In some examples, after determining estimated value(s) (outputs 410) or training the neural network, the estimating module 236 can operate the extraction module 232 to extract second feature values from a second plurality of datasets organized according to the respective, different data domains as noted above. Second feature values for a given input set can correspond to a time later than the feature values previously determined for that input set, or to a time later than any time of the extracted feature values previously determined for the input sets. The estimating module 236 can then operate the trained neural networks 402 to provide a second estimated value of the target feature based at least in part on the extracted second feature values having times in the relative time periods of the corresponding neural networks 402. This can permit operating the computational model 224 in a sliding-window fashion, in which the output for the W' neural network 402(W) is based at least in part on feature values at most the W' time period and the W−1 preceding time periods. Sliding-window operation can reduce the amount of memory and processor power required for forecasting by limiting the amount of historical data to be stored or processed. The sliding window can extend over any absolute or relative time range, e.g., W days, weeks, months, years, or centuries. For example, feature values can be provided for weeks 1−W to neural networks 402(1)-402(W), respectively, and output 410(W) can be determined as an expected value for week W+L. Feature values can then be provided for weeks 2-W+1 to neural networks 402(1)-402(W), respectively, and output 410(W) can be determined as an expected value for week W+1+L.

Figure 5:
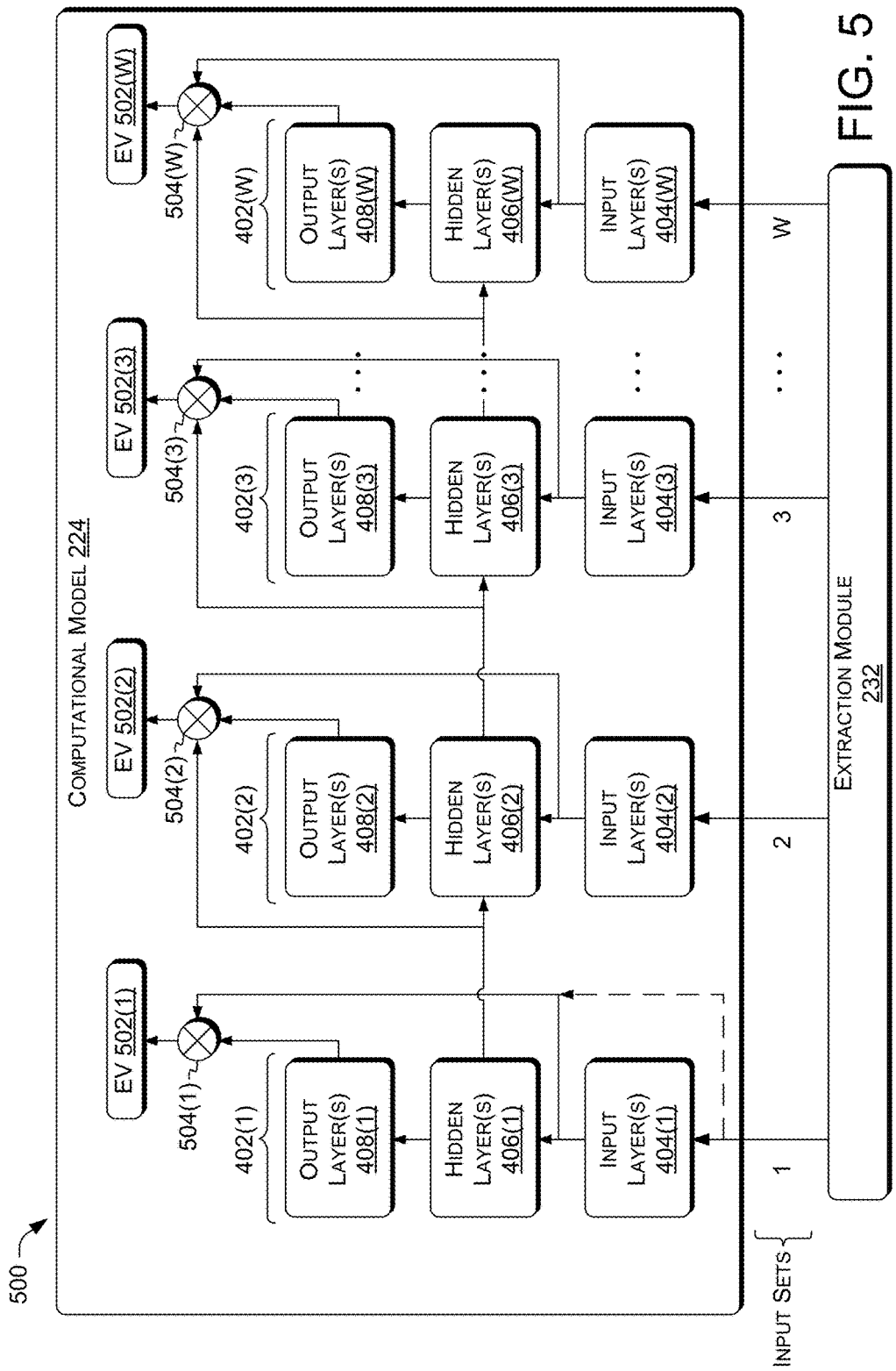
FIG. 5 is a block diagram depicting operation of a computational model using neural networks according to various examples described herein.

FIG. 5 is a dataflow diagram 500 illustrating an example implementation of operation of a computational model 224 using neural networks. The extraction module 232 in this examples provides input sets 1−W as discussed above with reference to FIG. 4. The computational model 224 has sets 404 of input layer(s), sets 406 of hidden layer(s), and sets 408 of output layer(s) as discussed above with reference to FIG. 4.

The computational model 224 in this example produces output(s) 502(1)-502(W) (individually or collectively referred to herein with reference 502), e.g., expected values ("EV") of target feature(s). In this example, the output(s) 502 are provided by adjuster(s) 504(1)-504(W) (individually or collectively referred to herein with reference 504), graphically represented as crossed circles. The adjusters 504 can receive value(s) from the output layer(s) 408 and adjust those value(s) to provide the output(s) 502. The adjusters 504 can receive value(s) from the input layer(s) 404. The adjusters 504 can additionally or alternatively receive value(s) from the input sets, as graphically represented by the dashed arrow bypassing input layer(s) 404(1) (omitted elsewhere for brevity). The adjuster 504 in the $i^{th}$ neural network 402 can also receive value(s) from the hidden layer(s) 406 of the i$-1^{th}$ neural network 402. For example, as shown, the adjuster 504(2) of the neural network 402(2) receives value(s) from the hidden layer(s) 406(1) of the neural network 402(1).

In some examples, the adjuster 504($i$), i∈[2, W], is configured to provide the output 502($i$) by modifying the value(s) from the output layer(s) 408($i$), e.g., determining a multiplier, based at least in part on value(s) from the input set i, value(s) from the input layer(s) 404($i$), value(s) from the hidden layer(s) 406($i$–1), value(s) from individual ones of the hidden layer(s) in sets 406($i$–2, . . . , 1), or any combination thereof. For example, the adjuster 504($i$) can increase or decrease the value(s) from the output layer(s) 408($i$) by addition, subtraction, multiplication by the multiplier, or division, can compress those value(s) linearly or nonlinearly, e.g., using a sigmoid function, or can lock those value(s) at selected threshold(s) using, e.g., min or max functions. In some examples, the adjuster 504($i$) can include a neural network or hidden layer (not shown) that provides the output 502($i$) based at least in part on one or more value(s) input to the adjuster 504($i$) and one or more neuron parameters of neurons in the neural network or hidden layer. In some examples, the adjuster 504($i$) determines a multiplier as noted above and multiplies value(s) from the output layer 408($i$) by the determined multiplier to provide the output(s) 410($i$).

In some examples, using adjusters 504 can permit analyzing data including recurrent structure. For example, time-series data, e.g., daily values of a quantity, may substantially consistently include outliers corresponding to holidays, election days, weekends, or other events that do not occur daily. Some examples are an increase in sales of many products during the Christmas shopping season. In another example, manufacturing data, e.g., minute-by-minute data of conformance to control limits of a manufacturing process, may substantially consistently include outliers corresponding to shift changes, machine cleaning, or deliveries of raw material. Such outliers are referred to herein as "event-triggered outliers" since they are related with particular events rather than, or in addition to, being related to normal machine wear, type of machine, particular machine, or other factors that are substantially more constant or that change relatively more gradually. The term "outliers" as used herein does not require that event-triggered outliers be, e.g., any particular number of standard deviations away from non-outlier values. A multiplier of 1.0, determined as noted above, thus corresponds to a condition in which no event-driven outliers are predicted. Adjusters 504 can modify value(s) from the output layer(s) 408 according to trend or historical information carried in the hidden layer(s) 406 to more accurately model or forecast data including event-driven outliers.

Accordingly, in some examples, the computational model 224 includes a first neural network (e.g., neural network 402(3)) and a second neural network (e.g., neural network 402(3)) having respective input layers 404, respective hidden layers 406, and respective output layers 408. The estimating module 236 can be configured to determine the estimated value of the target feature based at least in part on an output of the hidden layer 406(3) of the second neural network 402(3) and to adjust the determined estimated value of the target feature based at least in part on an output of the hidden layer 406(2) of the first neural network 402(2).

Illustrative Processes

Figure 6:
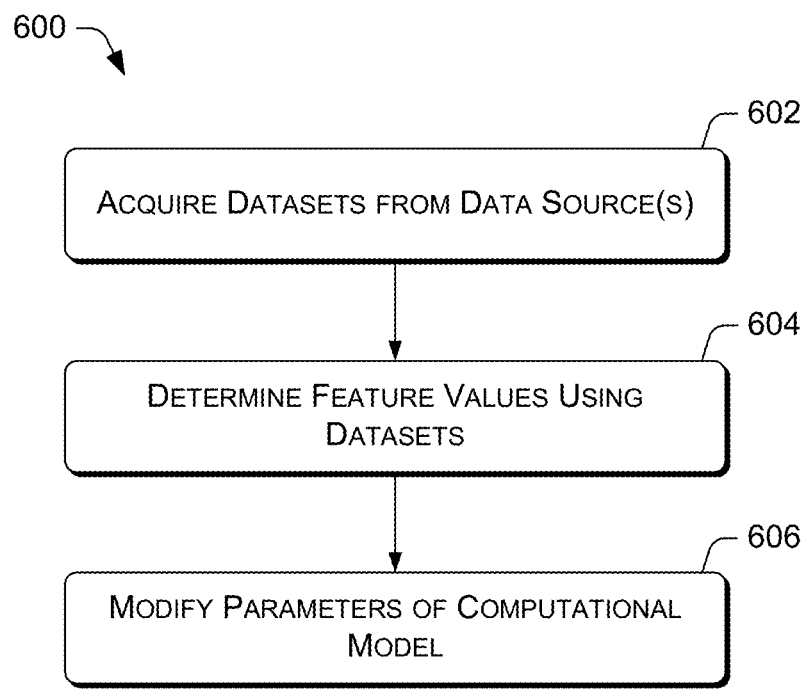
FIG. 6 is a flow diagram that illustrates example processes for training a computational model according to various examples described herein.
Figure 7:
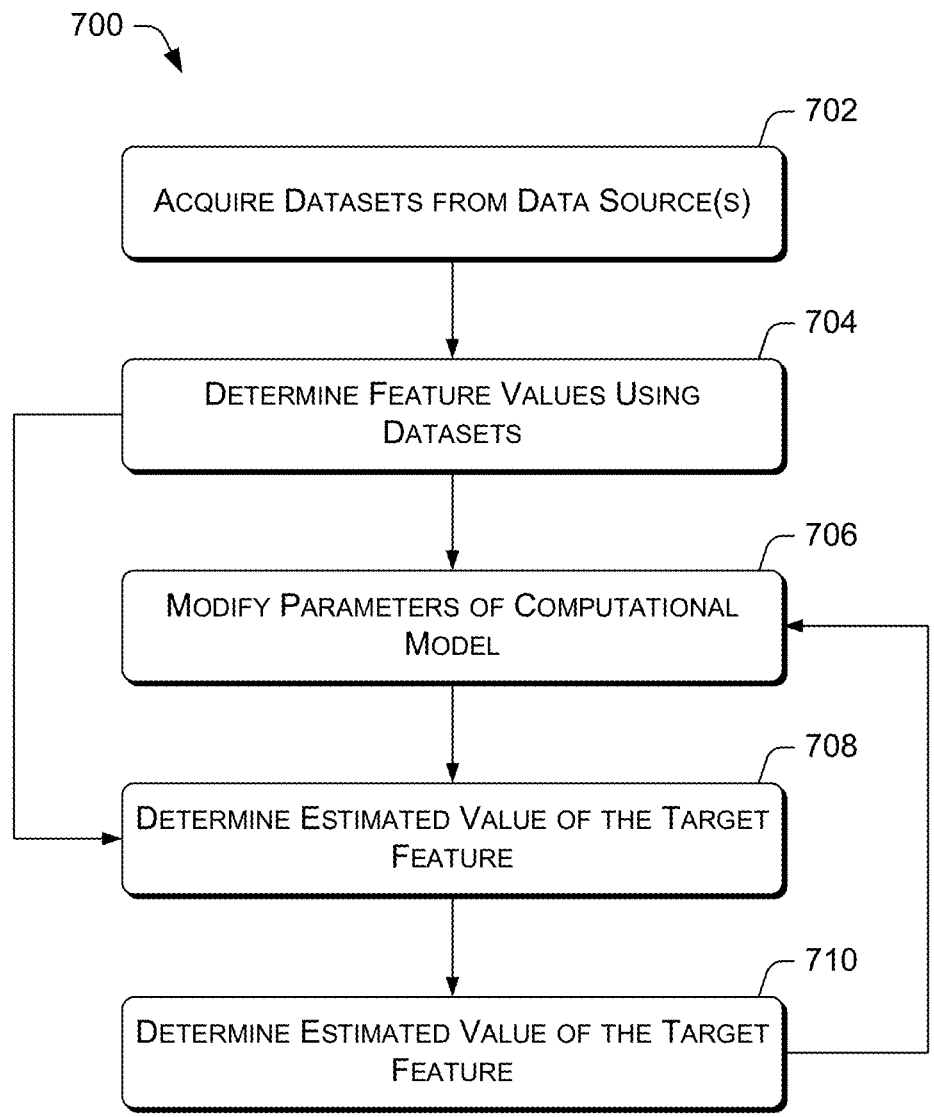
FIG. 7 is a flow diagram that illustrates example processes for training and operating a computational model according to various examples described herein.
Figure 8:
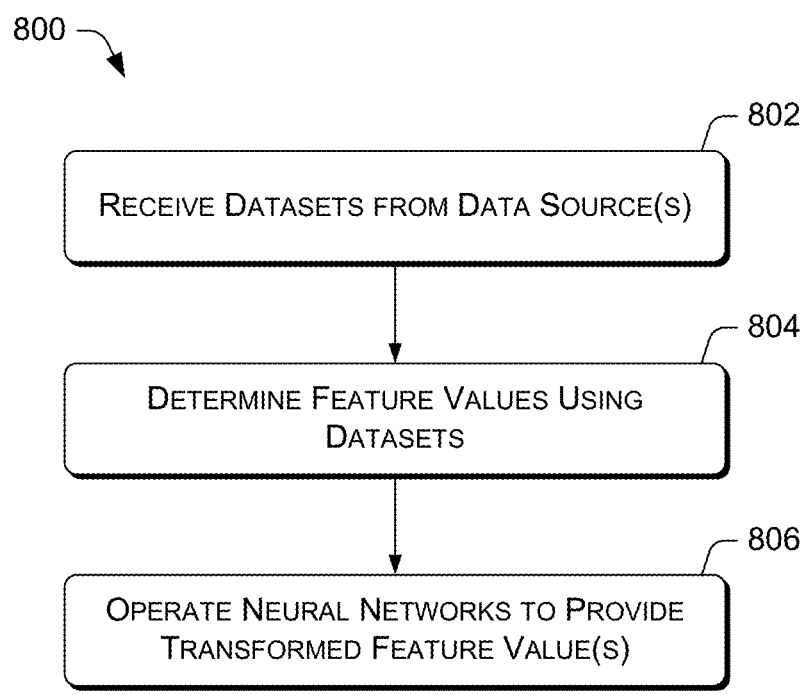
FIG. 8 is a flow diagram that illustrates example processes for training a computational model according to various examples described herein.
Figure 9:
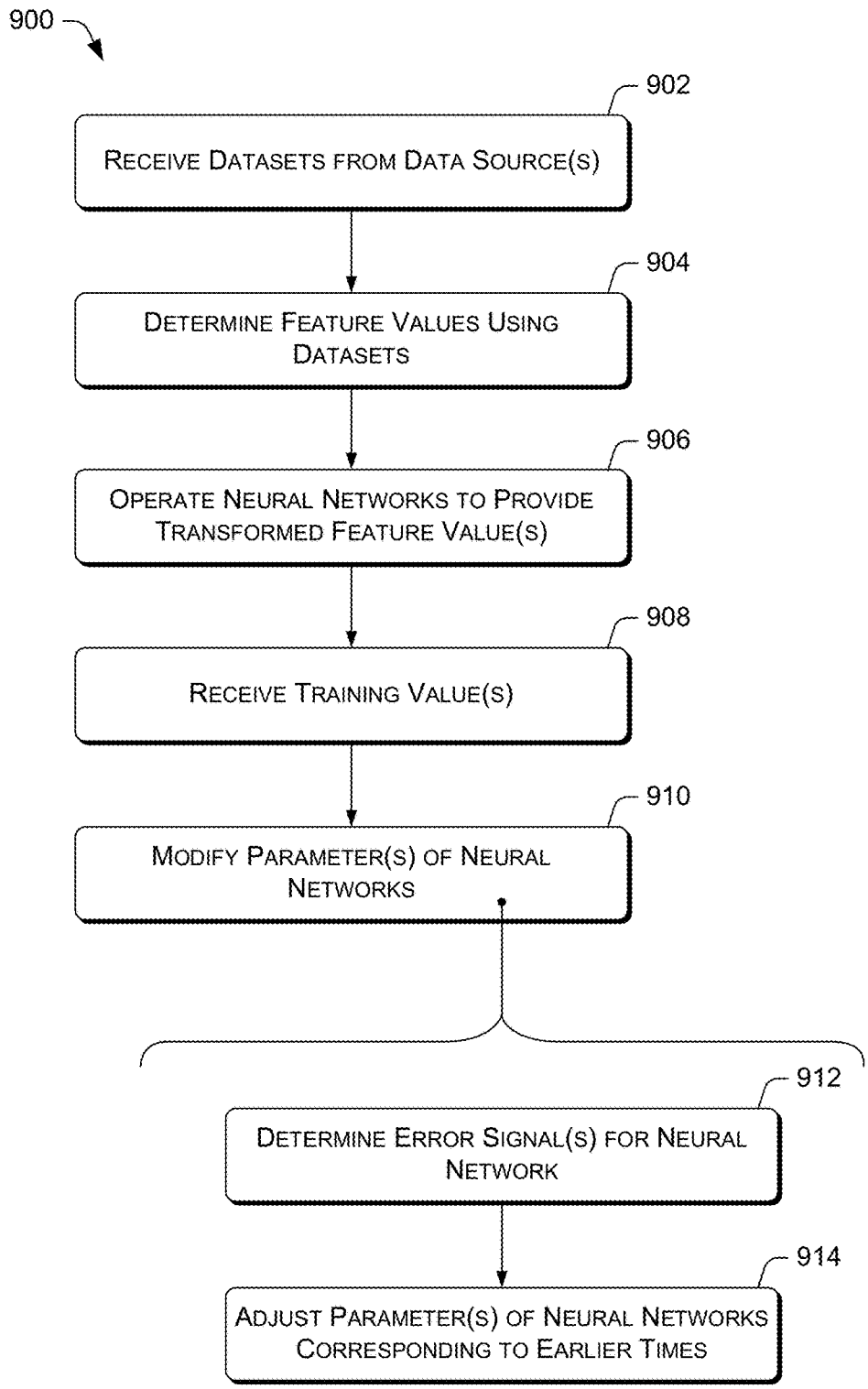
FIG. 9 is a flow diagram that illustrates example processes for operating and training a computational model according to various examples described herein.

FIG. 6 is a flow diagram that illustrates an example process 600 for training a computational model. Example functions shown in FIG. 6 and other flow diagrams and example processes herein can be implemented on or otherwise embodied in one or more computing device(s) 102 or 104, e.g., a computing device 200, e.g., using software running on such device(s). For the sake of illustration, the example process 600 is described below with reference to processing unit 214 and other components of computing device 200, FIG. 2, that can carry out or participate in the steps of the exemplary method. However, other processing unit(s) such as processing unit 112 and/or other components of computing device(s) 102 or 104 can carry out step(s) of described example processes such as process 600. Similarly, exemplary method(s) shown in FIGS. 7, 8, and 9 are also not limited to being carried out by any specifically-identified components.

The order in which the operations are described in each example flow diagram or process is not intended to be construed as a limitation, and any number of the described operations can be combined in any order and/or in parallel to implement each process. Moreover, the operations in each of FIGS. 6, 7, 8, and 9 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

In some examples, at block 602, a plurality of datasets can be acquired from one or more data sources, e.g., from respective data sources. The data in each dataset can be organized according to a respective data domain. Some examples are described above with reference to the accessing module 230.

At block 604, values of a plurality of features can be determined based at least in part on the plurality of datasets. Some examples are described above with reference to the extraction module 232.

At block 606, at least some of the input-specific parameters or the history parameters of a computational model 224 can be modified based at least in part on the values of the plurality of features. Some examples are described above with reference to the updating module 234.

FIG. 7 is a flow diagram that illustrates an example process 700 for training and operating a computational model.

In some examples, at block 702, a plurality of datasets can be acquired from one or more data sources. In some examples, each data source can provide a single dataset. In some examples, at least one of the one or more data sources can provide more than one of the datasets. The data in each dataset can be organized according to a respective data domain. Some examples are described above with reference to block 602.

At block 704, values of a plurality of features can be determined based at least in part on the plurality of datasets. Some examples are described above with reference to block 604. In some examples, block 704 includes determining the plurality of features including a target feature and one or more reference features. For example, the target feature can represent a type of value to be forecast based in data values of the reference features. Block 704 can be followed by block 706 or block 708.

At block 706, at least some of the input-specific parameters or the history parameters of the computational model can be modified based at least in part on the values of the plurality of features. Some examples are described above with reference to block 606. In some examples, block 706 includes modifying at least some of the input-specific parameters or the history parameters of the computational model based at least in part on values of the target feature and values of the one or more reference features.

In some examples, at block 708, e.g., after block 704 or block 706, an estimated value of the target feature can be determined based at least in part on the computational model (e.g., after modification in block 606) and values of the one or more reference features. At least some of the values of the one or more reference features can be provided in each of the input sets of the computational model.

In some examples, at block 710, an error value of the estimated value of the target feature from block 708 can be determined based at least in part on a corresponding training value. Some examples are discussed above with reference to the updating module 234 shown in FIGS. 2 and 4. In some examples, block 710 can be followed by block 706. In this way, the computational model can be modified, e.g., via neural-network training as discussed above with reference to FIG. 4, based at least in part on the error value and the feature values. Some examples are discussed above with reference to the updating module 234 shown in FIGS. 2 and 4.

FIG. 8 is a flow diagram that illustrates an example process 800 for operating a computational model. For purposes of explanation, in the discussion of FIGS. 8 and 9, nonlimiting example components from FIG. 4 are discussed below; other components can also or alternatively be used.

In some examples, at block 802, datasets can be received from a plurality of respective data sources. The datasets are organized according to respective unique data domains. Each dataset includes data value(s) associated with individual ones of a plurality of times. The times can be, e.g., time periods (e.g., March 2015) or discrete instants or specific times (e.g., Mar. 14, 2015, at 9:26:53 AM). Example dataset organizations and domains are discussed above with reference to FIG. 3.

At block 804, using a processing unit, feature value(s) associated with each of the plurality of times can be determined based at least in part on the data value(s) associated with the corresponding ones of the plurality of times. Some examples are discussed above with reference to the extraction module 232.

At block 806, respective neural networks 402 can be operated for each of the plurality of times. The neural networks 402 can provide transformed feature value(s) based at least in part on ones of the feature value(s) associated with the corresponding ones of the plurality of times. Some examples are discussed above with reference to FIG. 4. For example, a first one of the neural networks 402 can include a hidden layer 406 configured to provide feedforward value(s). A second, different one of the neural networks 402 can be configured to provide at least some of the respective transformed feature value(s) based at least in part on the feedforward value(s). The time of the first one of the neural networks 402 can be earlier than the time of the second one of the neural networks 402, e.g., the first neural network 402 can precede the second neural network 402 in a temporal sequence, e.g., of days, weeks, months, quarters, or years. Elements of the temporal sequence can be regularly or irregularly spaced.

In some examples, as discussed above with reference to FIG. 5, the transformed feature value(s), e.g., estimated value(s), can be determined based at least in part on ones of the feature value(s) output by the respective hidden layer(s) of ones of the neural networks 402. The transformed feature value(s) can then be adjusted based at least in part on outputs of the hidden layer 406 of the another of the neural networks 402, e.g., an earlier one of the neural networks 402 in a temporal sequence. The adjustment can include, e.g., multiplication by a value, thresholding, or limiting.

FIG. 9 is a flow diagram that illustrates an example process 900 for operating and training a computational model.

In some examples, at block 902, datasets can be received from one or more data source(s), e.g., from a plurality of respective data sources. Some examples are described above with reference to block 802.

At block 904, using a processing unit 214, feature value(s) associated with each of the plurality of times can be determined based at least in part on the data value(s) associated with the corresponding ones of the plurality of times. Some examples are discussed above with reference to block 804.

At block 906, respective neural networks 402 can be operated for each of the plurality of times. The neural networks 402 can provide transformed feature value(s) based at least in part on ones of the feature value(s). Some examples are discussed above with reference to block 806.

In some examples, each of the neural networks, e.g., neural networks 402(1)-402(W), can be configured to provide at least some of the respective transformed feature value(s) based at least in part on one or more of the feedforward value(s) from each of the neural networks 402 having an earlier time. For example, neural network 402(W) can provide a respective transformed feature value(s) based at least in part on one or more of the feedforward value(s) from each of the neural networks 402(1)-402(W−1), whether those values are fed forward directly to neural network 402(W), through a daisy chain configuration as shown in FIG. 4, or in another way. In other examples, one or more of the neural networks, e.g., neural networks 402(1)-402(W), can be configured to provide at least some of the respective transformed feature value(s) based at least in part on one or more of the feedforward value(s) from fewer than all of the neural networks 402 having an earlier time.

At block 908, training value(s) 412 associated with individual ones of the plurality of times can be received. Some examples are discussed above with reference to training value(s) 412, FIG. 4.

At block 910, parameter(s) of individual ones of the neural networks 402 can be modified based at least in part on at least some of the training value(s) 412, feature value(s), and transformed feature value(s) associated with the corresponding ones of the plurality of times. Some examples are discussed above with reference to the updating module 234. For example, SGD neural-network training with backpropagation can be used to modify neuron parameters of at least some of the neural networks 402.

In some examples, as discussed above, input sets 1–W, FIG. 4, correspond to time periods 1–W, and output values 410(1)-410(W) correspond to time periods 1+L through W+L. In these examples, W training values 412 or sets of training values 412 can correspond to time periods 1+L through W+L, respectively. This permits training the neural networks 402 using training values 412 that are relevant to the outputs of each specific neural network 402. In some examples, L is not an expressly-specified parameter of the computational model 224, but is trained into the computational model implicitly by selection of training values 412 corresponding to time periods L periods later than the corresponding input feature values. In some examples, block 910 can include blocks 912 and 914.

At block 912, error signal(s) for a selected one of the neural networks 402 can be determined based at least in part on at least some of the corresponding training value(s) and at least some of the corresponding transformed feature value(s). Some examples are discussed above with reference to the updating module 234, FIGS. 2 and 4.

At block 914, the parameter(s) of selected one(s) of the neural networks 402 corresponding to time(s) earlier than the time of the selected one of the neural networks 402 can be adjusted based at least in part on the determined error signal(s). Some examples are discussed above with reference to the updating module 234, FIGS. 2 and 4. For example, neural-network training with backpropagation can be performed to update neuron parameter(s). In some examples, block 914 includes adjusting the parameters of each of the neural networks corresponding to a respective time earlier than the time of the selected one of the neural networks. For example, in FIG. 4, when the selected one of the neural networks is neural network 402(W), block 914 can include updating parameter(s) for neural networks 402(1)-402(W-1). This can permit accounting for historical effects reaching over a large number of time periods. In other examples, fewer than all of the temporally preceding neural networks can be updated, e.g., one or more neural networks of 402(1)-402(W-1) when the selected one of the neural networks is neural network 402(W).

Illustrative Results

A dataset of product activations over time was analyzed using a prior scheme and using techniques described herein. A mean absolute error was computed as in Eq. (4):

$$\operatorname*{mean}_{t}\left|\frac{p_t - a_t}{a_t}\right| \quad (4)$$

for predicted values $p_t$ and actual values $a_t$ for each time t in the tested data. Tests were performed for values of L=1 week, 2 weeks, 3 weeks, and 4 weeks. The mean absolute error values are summarized in Table 2. Lower errors indicate more accurate forecasting.

TABLE 3

| L Value | Prior Scheme | Techniques Herein |
|---|---|---|
| 1 | 17 | 12 |
| 2 | 19 | 19 |
| 3 | 22 | 21 |
| 4 | 25 | 22 |

As shown in Table 2, the techniques herein provide forecasting accuracy equal to or surpassing that of the tested prior scheme.

EXAMPLE CLAUSES

A: A system comprising: one or more computer-readable media having thereon: a plurality of modules; and a computational model comprising respective input-specific parameters for each of a plurality of input sets of the computational model and one or more history parameters; and one or more processing unit(s) operably coupled to one(s) of the computer-readable media and communicatively connectable with a plurality of data sources, each of the data sources having a respective unique data domain and the processing unit(s) adapted to execute modules of the plurality of modules comprising: an accessing module configured to acquire a plurality of datasets from respective ones of the data sources, wherein the data in each dataset is organized according to the respective data domain; an extraction module configured to determine values of a plurality of features based at least in part on the plurality of datasets; and an updating module configured to modify at least some of the input-specific parameters or the history parameters of the computational model based at least in part on the values of the plurality of features.

B: A system as paragraph A recites, wherein: the plurality of features includes a target feature and one or more reference features; and the updating module is configured to modify the at least some of the input-specific parameters or the history parameters of the computational model based at least in part on values of the target feature and values of the one or more reference features.

C: A system as paragraph B recites, wherein the plurality of modules further comprises: an estimating module configured to determine an estimated value of the target feature based at least in part on the modified computational model and values of the one or more reference features, wherein the estimating module provides at least some of the values of the one or more reference features in each of the input sets of the computational model.

D: A system as paragraph C recites, wherein the estimated value of the target feature corresponds to a time subsequent to a time period of the values of the one or more reference features.

E: A system as paragraph C or D recites, wherein: the computational model includes a first neural network and a second neural network having respective input layers, respective hidden layer, and respective output layers; and the estimating modules is further configured to determine the estimated value of the target feature based at least in part on an output of the hidden layer of the second neural network and to adjust the determined estimated value of the target feature based at least in part on an output of the hidden layer of the first neural network.

F: A system as any of paragraphs A-E recites, wherein the input sets of the computational model correspond to respective ones of a plurality of time periods and the data domains include domains of one or more of the following per time period: completion counts, event counts, number of search queries, proportion of search queries, selections of search results, newly-created documents, newly-created documents in selected content repositories, social-media posts dates, date events, web-page visits.

G: A system as paragraph F recites, wherein a selected first one of the input sets of the computational model and a selected second one of the input sets of the computational model are separated along the temporal sequence by one day, one week, one month, or one year.

H: A system as any of paragraphs A-G recites, wherein: the computational model includes respective neural networks for each of the input sets, each of the neural networks having an input layer, a hidden layer, and an output layer; the input-specific parameters correspond to neuron parameters of the input layer of the corresponding neural network; the history parameters correspond to neuron parameters of the hidden layer of the corresponding neural network; and the output layer of at least one of the neural networks is connected to the respective hidden layer(s) of one or more other(s) of the neural networks.

I: A system as paragraph H recites, wherein the respective output layer of each of the neural networks is connected to the respective hidden layer.

J: A system as paragraph H or I recites, wherein the input sets of the computational model correspond to a temporal sequence and a first one of the neural networks is connected to the respective hidden layer of one of the neural networks corresponding to an input set earlier in the temporal sequence than the input set of first one of the neural networks.

K: A system as any of paragraphs A-J recites, wherein the extraction module is further configured to determine the values of at least one of the plurality of features based at least in part on records in at least one of the plurality of datasets including predetermined search keys.

L: A system as any of paragraphs A-K recites, wherein the extraction module is further configured to: determine semantic features of records in at least one of the plurality of datasets; and determine the values of at least one of the plurality of features based at least in part on ones of the records having the semantic features corresponding to predetermined target semantic features.

M: A method, comprising: receiving, from a plurality of data sources, respective datasets organized according to respective unique data domains, wherein each dataset includes data value(s) associated with individual ones of a plurality of times; determining, using a processing unit, feature value(s) associated with each of the plurality of times based at least in part on the data value(s) associated with the corresponding ones of the plurality of times; and operating respective neural networks for each of the plurality of times to provide transformed feature value(s) based at least in part on ones of the feature value(s) associated with the corresponding ones of the plurality of times, wherein: a first one of the neural networks includes a hidden layer configured to provide feedforward value(s); a second, different one of the neural networks is configured to provide at least some of the respective transformed feature value(s) based at least in part on the feedforward value(s); and the time of the first one of the neural networks is earlier than the time of the second one of the neural networks.

N: A method as paragraph M recites, further comprising: receiving training value(s) associated with individual ones of the plurality of times; and modifying parameter(s) of individual ones of the neural networks based at least in part on at least some of the training value(s), feature value(s), and transformed feature value(s) associated with the corresponding ones of the plurality of times.

O: A method as paragraph N recites, wherein the modifying further comprises: determining error signal(s) for a selected one of the neural networks based at least in part on at least some of the corresponding training value(s) and at least some of the corresponding transformed feature value (s); and adjusting, based at least in part on the determined error signal(s), the parameter(s) of selected one(s) of the neural networks corresponding to time(s) earlier than the time of the selected one of the neural networks.

P: A method as paragraph O recites, wherein the adjusting comprises adjusting the parameters of each of the neural networks corresponding to a respective time earlier than the time of the selected one of the neural networks.

Q: A method as any of paragraphs M-P recites, wherein each of the neural networks is configured to provide at least some of the respective transformed feature value(s) based at least in part on one or more of the feedforward value(s) from each of the neural networks having an earlier time.

R: A computer-readable medium, e.g., a computer storage medium, having thereon computer-executable instructions, the computer-executable instructions upon execution configuring a computer to perform operations as any of paragraphs M-P recites.

S: A device comprising: a processor; and a computer-readable medium, e.g., a computer storage medium, having thereon computer-executable instructions, the computer-executable instructions upon execution by the processor configuring the device to perform operations as any of paragraphs M-P describes.

T: A system comprising: means for processing; and means for storing having thereon computer-executable instructions, the computer-executable instructions including means to configure the device to carry out a method any of paragraphs M-S describes.

U: A system, comprising: means for receiving, from a plurality of data sources, respective datasets organized according to respective unique data domains, wherein each dataset includes data value(s) associated with individual ones of a plurality of times; means for determining, using a processing unit, feature value(s) associated with each of the plurality of times based at least in part on the data value(s) associated with the corresponding ones of the plurality of times; and means for operating respective neural networks for each of the plurality of times to provide transformed feature value(s) based at least in part on ones of the feature value(s) associated with the corresponding ones of the plurality of times, wherein: a first one of the neural networks includes a hidden layer configured to provide feedforward value(s); a second, different one of the neural networks is configured to provide at least some of the respective transformed feature value(s) based at least in part on the feedforward value(s); and the time of the first one of the neural networks is earlier than the time of the second one of the neural networks.

V: A system as paragraph U recites, further comprising: means for receiving training value(s) associated with individual ones of the plurality of times; and means for modifying parameter(s) of individual ones of the neural networks based at least in part on at least some of the training value(s), feature value(s), and transformed feature value(s) associated with the corresponding ones of the plurality of times.

W: A system as paragraph V recites, wherein the means for modifying further comprises: means for determining error signal(s) for a selected one of the neural networks based at least in part on at least some of the corresponding training value(s) and at least some of the corresponding transformed feature value(s); and means for adjusting, based at least in part on the determined error signal(s), the parameter(s) of selected one(s) of the neural networks corresponding to time(s) earlier than the time of the selected one of the neural networks.

X: A system as paragraph W recites, wherein the means for adjusting comprises means for adjusting the parameters of each of the neural networks corresponding to a respective time earlier than the time of the selected one of the neural networks.

Y: A system as any of paragraphs U-X recites, wherein each of the neural networks is configured to provide at least some of the respective transformed feature value(s) based at least in part on one or more of the feedforward value(s) from each of the neural networks having an earlier time.

Z: A computer-readable medium having thereon computer-executable instructions, the computer-executable instructions upon execution configuring a computer to perform operations comprising: extracting feature values from a plurality of datasets organized according to respective, different data domains, each feature value corresponding to a time; operating a plurality of neural networks to provide an estimated value of a target feature based at least in part on the feature values, wherein each of the neural networks corresponds to a respective relative time period and includes a respective hidden layer communicatively connected with the hidden layer of another of the neural networks having a later relative time period; determining an error value of the estimated value of the target feature based at least in part on a corresponding training value; and training the plurality of neural networks based at least in part on the error value and the feature values having times in the corresponding relative time period, wherein the training includes adjusting parameters of the respective hidden layers of at least two of the neural networks.

AA: A computer-readable medium as paragraph Z recites, the operations further comprising: extracting second feature values from a second plurality of datasets organized according to the respective, different data domains, each second feature value corresponding to a time later than any time of the extracted feature values; and operating the trained plurality of neural networks to provide a second estimated value of the target feature based at least in part on the second feature values, wherein each neural network of the trained plurality of neural networks is operated with extracted second feature values having times in the corresponding relative time periods.

AB: A computer-readable medium as paragraph Z or AA recites, the operations for operating each of the plurality of neural networks further including determining the estimated value based at least in part on output(s) of the respective hidden layer and adjusting the estimated value based at least in part on output(s) of the hidden layer of the another of the neural networks.

CONCLUSION

Various DNN training and operation techniques described herein can permit more efficiently analyzing data from disparate data sources. Various examples can provide more effective ongoing training of neural networks, e.g., based on sensor readings, providing improved accuracy with reduced computational power compared to repeatedly retraining the neural networks. Various examples operate multiple neural networks, permitting the operation of those neural networks to be carried out in parallel. This parallel operation can permit operating the neural network with reduced computational load and memory requirements compared to operating a monolithic neural network.

Although the techniques have been described in language specific to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc., can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   one or more computer-readable media having thereon:
      a plurality of modules; and
      a computational model comprising respective neural networks and respective input-specific parameters for each of a plurality of input sets of the computational model and one or more history parameters; and
   one or more processing unit(s) operably coupled to one(s) of the computer-readable media and communicatively connectable with a plurality of data sources, each of the data sources having a respective unique data domain and the processing unit(s) adapted to execute modules of the plurality of modules comprising:
      an accessing module configured to acquire a plurality of datasets from respective ones of the data sources, wherein the data in each dataset is organized according to the respective data domain;
      an extraction module configured to determine values of a plurality of features based at least in part on the plurality of datasets, the plurality of features including a target feature and one or more reference features;
      an estimating module configured to determine an estimated value of the target feature based at least in part on the computational model and the values of the one or more reference features; and
      an updating module configured to modify at least some of the input-specific parameters or the history parameters of the computational model based at least in part on the value of the target feature and the estimated value of the target feature.

2. A system as claim 1 recites, wherein the estimated value of the target feature corresponds to a time subsequent to a time period of the values of the one or more reference features.

3. A system as claim 1 recites, wherein:
   the computational model includes a first neural network and a second neural network having respective input layers, respective hidden layer, and respective output layers, and
   the estimating modules is further configured to determine the estimated value of the target feature based at least in part on an output of the hidden layer of the second neural network and to adjust the determined estimated value of the target feature based at least in part on an output of the hidden layer of the first neural network.

4. A system as claim 1 recites, wherein the input sets of the computational model correspond to respective ones of a plurality of time periods and the data domains include domains of one or more of the following per time period: completion counts, event counts, number of search queries, proportion of search queries, selections of search results, newly-created documents, newly-created documents in selected content repositories, social-media posts dates, date events, web-page visits.

5. A system as claim 4 recites, wherein a selected first one of the input sets of the computational model and a selected second one of the input sets of the computational model are separated along the temporal sequence by one day, one week, one month, or one year.

6. A system as claim 1 recites, wherein the extraction module is further configured to determine the values of at least one of the plurality of features based at least in part on records in at least one of the plurality of datasets including predetermined search keys.

7. A system as claim 1 recites, wherein the extraction module is further configured to:
   determine semantic features of records in at least one of the plurality of datasets; and
   determine the values of at least one of the plurality of features based at least in part on ones of the records having the semantic features corresponding to predetermined target semantic features.

8. The system of claim 1, wherein each of the neural networks has an input layer, a hidden layer, and an output layer, the input-specific parameters corresponding to neuron parameters of the input layer of the corresponding neural network, the history parameters corresponding to neuron parameters of the hidden layer of the corresponding neural network, and the output layer of at least one of the neural networks being connected to the respective hidden layer(s) of one or more other(s) of the neural networks.

9. A system as claim 8 recites, wherein the respective output layer of each of the neural networks is connected to the respective hidden layer.

10. A system as claim 8 recites, wherein the input sets of the computational model correspond to a temporal sequence and a first one of the neural networks is connected to the respective hidden layer of one of the neural networks corresponding to an input set earlier in the temporal sequence than the input set of first one of the neural networks.

11. A method, comprising:
    receiving, from a plurality of data sources, respective datasets organized according to respective unique data domains, wherein each dataset includes data value(s) associated with individual ones of a plurality of times;
    determining, using a processing unit, feature value(s) associated with each of the plurality of times based at least in part on the data value(s) associated with the corresponding ones of the plurality of times; and
    operating respective neural networks for each of the plurality of times to provide transformed feature value(s) based at least in part on ones of the feature value(s) associated with the corresponding ones of the plurality of times, wherein:
    a first one of the neural networks includes a hidden layer configured to provide feedforward value(s);
    a second, different one of the neural networks is configured to provide at least some of the respective transformed feature value(s) based at least in part on the feedforward value(s); and
    the time of the first one of the neural networks is earlier than the time of the second one of the neural networks.

12. A method as claim 11 recites, further comprising:
    receiving training value(s) associated with individual ones of the plurality of times; and
    modifying parameter(s) of individual ones of the neural networks based at least in part on at least some of the training value(s), feature value(s), and transformed feature value(s) associated with the corresponding ones of the plurality of times.

13. A method as claim 12 recites, wherein the modifying further comprises:
    determining error signal(s) for a selected one of the neural networks based at least in part on at least some of the corresponding training value(s) and at least some of the corresponding transformed feature value(s); and
    adjusting, based at least in part on the determined error signal(s), the parameter(s) of selected one(s) of the neural networks corresponding to time(s) earlier than the time of the selected one of the neural networks.

14. A method as claim 13 recites, wherein the adjusting comprises adjusting the parameters of each of the neural networks corresponding to a respective time earlier than the time of the selected one of the neural networks.

15. A method as claim 11 recites, wherein each of the neural networks is configured to provide at least some of the respective transformed feature value(s) based at least in part on one or more of the feedforward value(s) from each of the neural networks having an earlier time.

16. A tangible computer storage medium having thereon computer-executable instructions, the computer-executable instructions upon execution configuring a computer to perform operations comprising:

extracting feature values from a plurality of datasets organized according to respective, different data domains, each feature value corresponding to a time;

operating a plurality of neural networks to provide an estimated value of a target feature based at least in part on the feature values, wherein each of the neural networks corresponds to a respective relative time period and includes a respective hidden layer communicatively connected with the hidden layer of another of the neural networks having a later relative time period;

determining an error value of the estimated value of the target feature based at least in part on a corresponding training value; and training the plurality of neural networks based at least in part on the error value and the feature values having times in the corresponding relative time period, wherein the training includes adjusting parameters of the respective hidden layers of at least two of the neural networks.

17. A computer-readable medium as claim 16 recites, the operations further comprising:

extracting second feature values from a second plurality of datasets organized according to the respective, different data domains, each second feature value corresponding to a time later than any time of the extracted feature values; and operating the trained plurality of neural networks to provide a second estimated value of the target feature based at least in part on the second feature values, wherein each neural network of the trained plurality of neural networks is operated with extracted second feature values having times in the corresponding relative time periods.

18. A computer-readable medium as claim 16 recites, the operations for operating each of the plurality of neural networks further including determining the estimated value based at least in part on output(s) of the respective hidden layer and adjusting the estimated value based at least in part on output(s) of the hidden layer of the another of the neural networks.

* * * * *